United States Patent
Sun et al.

(10) Patent No.: US 9,768,921 B2
(45) Date of Patent: Sep. 19, 2017

(54) DOWNLINK SIGNALING IN A HIGH EFFICIENCY WIRELESS LOCAL AREA NETWORK (WLAN)

(71) Applicant: Marvell World Trade Ltd., St. Michael (BB)

(72) Inventors: Yakun Sun, Sunnyvale, CA (US); Lei Wang, San Diego, CA (US); Jinjing Jiang, San Jose, CA (US); Liwen Chu, San Ramon, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/991,564

(22) Filed: Jan. 8, 2016

(65) Prior Publication Data
US 2016/0204912 A1    Jul. 14, 2016

Related U.S. Application Data

(60) Provisional application No. 62/222,509, filed on Sep. 23, 2015, provisional application No. 62/199,060, (Continued)

(51) Int. Cl.
*H04L 1/00* (2006.01)
*H04L 5/00* (2006.01)
(Continued)

(52) U.S. Cl.
CPC .......... *H04L 5/0007* (2013.01); *H04L 1/0042* (2013.01); *H04L 1/0059* (2013.01);
(Continued)

(58) Field of Classification Search
CPC ... H04L 1/0042; H04L 1/0059; H04L 5/0007; H04L 5/0044; H04L 27/12; H04L 27/2613
See application file for complete search history.

(56) References Cited

U.S. PATENT DOCUMENTS 8,155,138 B2    4/2012    van Nee
8,526,351 B2    9/2013    Fischer et al.
(Continued)

OTHER PUBLICATIONS

Noh et al.; IEEE 802.11-15/0575r0 "Preamble Structure in 80.11ax", May 2015, 15 pages.*
(Continued)

*Primary Examiner* — David B. Lugo

(57) ABSTRACT

A method for generating a physical layer (PHY) data unit includes generating a first signal field to include multiple copies of first signal field content, wherein the first signal field content spans one sub-band of a plurality of sub-bands of the PHY data unit, and wherein the multiple copies collectively span the plurality of sub-bands of the PHY data unit; generating a second signal field to include multiple copies of second signal field content, wherein the second signal field content spans multiple ones of the plurality of sub-bands of the PHY data unit, and wherein the multiple copies of the second signal field collectively span the plurality of sub-bands of the PHY data unit; generating a preamble of the PHY data unit to include at least the first signal field and the second signal field; generating the PHY data unit to include at least the preamble.

20 Claims, 35 Drawing Sheets

Related U.S. Application Data filed on Jul. 30, 2015, provisional application No. 62/191,663, filed on Jul. 13, 2015, provisional application No. 62/184,420, filed on Jun. 25, 2015, provisional application No. 62/148,666, filed on Apr. 16, 2015, provisional application No. 62/101,100, filed on Jan. 8, 2015.

(51) Int. Cl.
*H04L 27/12* (2006.01)
*H04L 27/26* (2006.01)
*H04W 84/12* (2009.01)

(52) U.S. Cl.
CPC ............ *H04L 5/0044* (2013.01); *H04L 27/12* (2013.01); *H04L 27/2613* (2013.01); *H04W 84/12* (2013.01)

(56) References Cited

U.S. PATENT DOCUMENTS

| | | | |
|---|---|---|---|
| 8,724,720 | B2 | 5/2014 | Srinivasa et al. |
| 9,197,298 | B2 | 11/2015 | Kim et al. |
| 9,397,873 | B2 | 7/2016 | Zhang et al. |
| 2009/0196163 | A1 | 8/2009 | Du |
| 2010/0260159 | A1 | 10/2010 | Zhang et al. |
| 2012/0147866 | A1 | 6/2012 | Stacey et al. |
| 2013/0229996 | A1 | 9/2013 | Wang et al. |
| 2015/0131517 | A1 | 5/2015 | Chu et al. |
| 2016/0262157 | A1* | 9/2016 | Kim ................. H04B 7/0413 |
| 2016/0301500 | A1* | 10/2016 | Suh ................. H04L 5/005 |
| 2016/0330300 | A1* | 11/2016 | Josiam ............. H04L 69/22 |
| 2016/0353414 | A1* | 12/2016 | Choi ................ H04W 4/005 |
| 2017/0048034 | A1* | 2/2017 | Bharadwaj ........ H04L 1/0072 |

OTHER PUBLICATIONS

Porat et al., IEEE 802.11-15/0873 "SIG-B Encoding Structure", Jul. 13, 2015, 13 pages.*

Josiam et al.; IEEE 802.11-15/1066r0 "HE-SIG-B Contents", Sep. 13, 2015, 25 pages.*

Porat et al., IEEE 802.11-15/1059 "SIG-B Encoding Structure Part II", Sep. 14, 2015, 15 pages.*

IEEE Std 802.11$^{TM}$ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11ac/D2.0 "Draft STANDARD for Information Technology-Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE P802.11ax$^{TM}$/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

Chun et al., "Legacy Support on HEW frame structure," doc: IEEE 11-13/1057r0, *The Institute of Electrical and Electronics Engineers, Inc.*, pp. 1-8 (Sep. 2013).

Perahia et al., "Gigabit Wireless LANs: an overview of IEEE 802.11 ac and 80211 ad," ACM Sigmobile Mobile Computing and Communications Review, vol. 15, No. 3, pp. 23-33 (Jul. 2011).

Seok et al., "HEW PPDU Format for Supporting MIMO-OFDMA," IEEE 802.11-14/1210r0, 16 pages, (Sep. 14, 2014).

Stacey et al., "IEEE P802.11, Wireless LANs, Proposed TGac Draft Amendment," *Institute of Electrical and Electronics Engineers, Inc.*, doc. no. IEEE 802.11-10, 1361 r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

International Search Report and Written Opinion in International Application No. PCT/US2016/012704, mailed Jul. 1, 2016 (10 pages).

U.S. Appl. No. 14/707,898, Sun et al., "Tone Block Allocation for Orthogonal Frequency Division Multiple Access Data Unit," filed May 8, 2015.

U.S. Appl. No. 15/173,152, Sun et al., "Tone Block and Spatial Stream Allocation," filed Jun. 3, 2016.

U.S. Appl. No. 15/174,263, Sun et al., "Systems and Methods for Implementing an OFDMA LTF Design for Wireless Network Communications," filed Jun. 6, 2016.

* cited by examiner

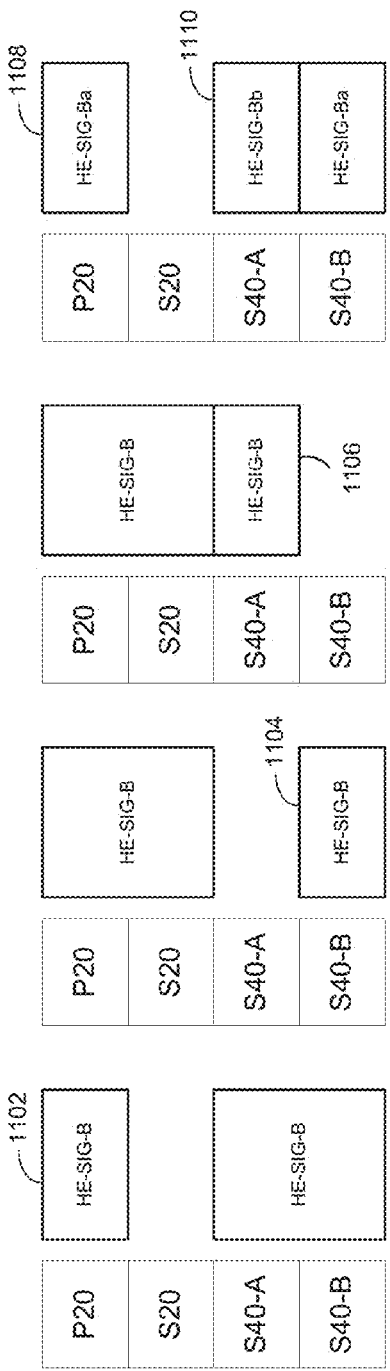
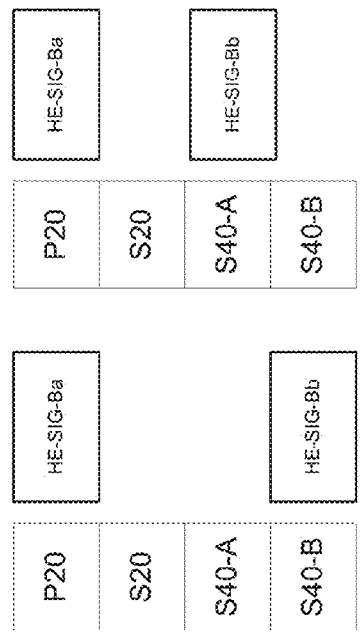
Fig. 11A, Fig. 11B, Fig. 11C, Fig. 11D, Fig. 11E, Fig. 11F

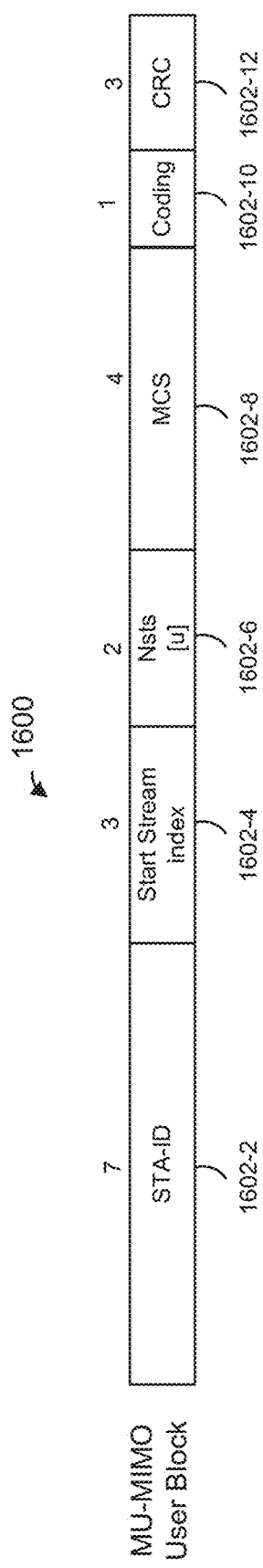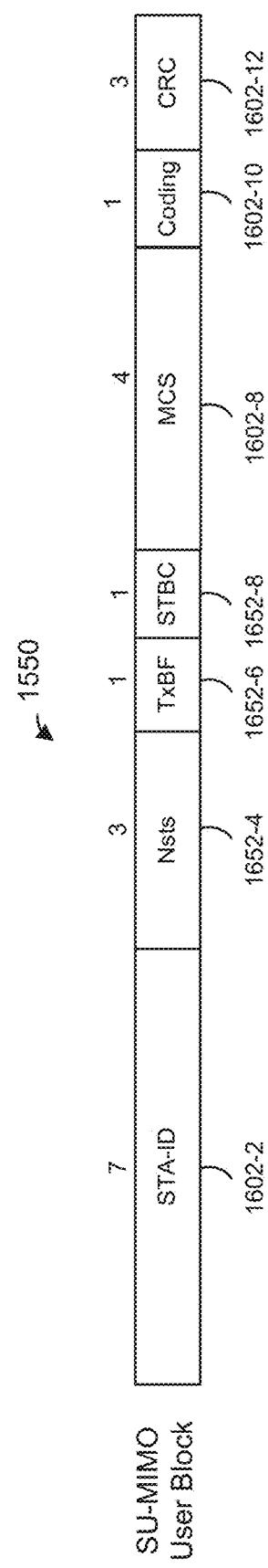

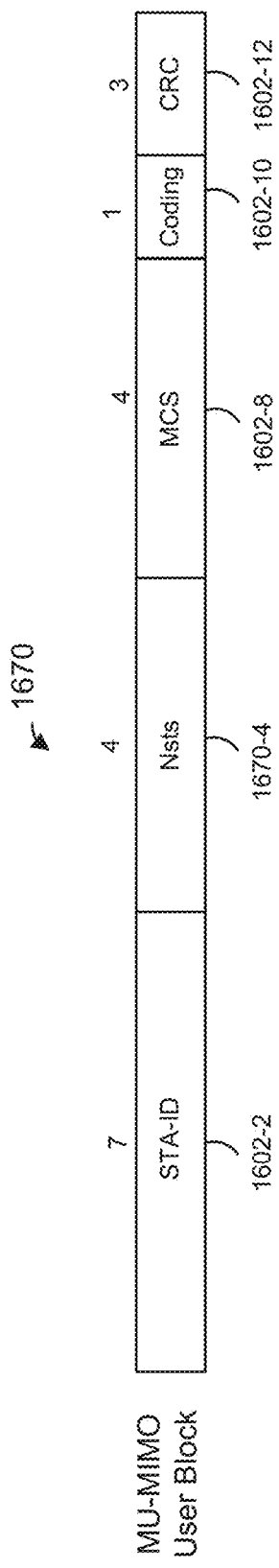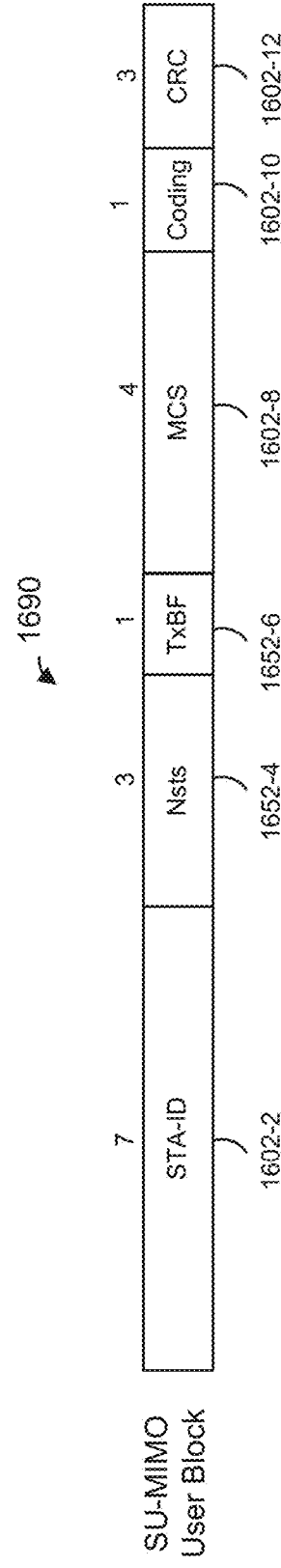

Fig. 17A

1700 — $N_{user}=4, 11$

| Nsts[1] | Nsts[2] | Nsts[3] | Nsts[4] |
|---|---|---|---|
| 1-4 | 1 | 1 | 1 |
| 2-4 | 2 | 1 | 1 |
| 3-3 | 3 | 1 | 1 |
| 2-3 | 2 | 2 | 1 |
| 2 | 2 | 2 | 2 |

1702 — $N_{user}=3, 13$

| Nsts[1] | Nsts[2] | Nsts[3] |
|---|---|---|
| 1-4 | 1 | 1 |
| 2-7 | 2 | 1 |
| 3-4 | 3 | 1 |
| 2-4 | 2 | 2 |
| 3 | 3 | 2 |

$N_{user}=2, 10$

| Nsts[1] | Nsts[2] |
|---|---|
| 1-4 | 1 |
| 2-7 | 2 |
| 3-4 | 3 |
| 4 | 4 |

$N_{user}=1, 4$

| Nsts[1] |
|---|
| 1-4 |

$N_{user}=6, 4$

| Nsts[1] | Nsts[2] | Nsts[3] | Nsts[4] | Nsts[5] | Nsts[6] |
|---|---|---|---|---|---|
| 1-2 | 1 | 1 | 1 | 1 | 1 |
| 2 | 2 | 1 | 1 | 1 | 1 |

$N_{user}=5, 6$

| Nsts[1] | Nsts[2] | Nsts[3] | Nsts[4] | Nsts[5] |
|---|---|---|---|---|
| 1-2 | 1 | 1 | 1 | 1 |
| 2-2 | 2 | 1 | 1 | 1 |

$N_{user}=7, 2$

| Nsts[1] | Nsts[2] | Nsts[3] | Nsts[4] | Nsts[5] | Nsts[6] | Nsts[7] |
|---|---|---|---|---|---|---|
| 1-2 | 1 | 1 | 1 | 1 | 1 | 1 |

$N_{user}=8, 1$

| Nsts[1] | Nsts[2] | Nsts[3] | Nsts[4] | Nsts[5] | Nsts[6] | Nsts[7] | Nsts[8] |
|---|---|---|---|---|---|---|---|
| 1 | 1 | 1 | 1 | 1 | 1 | 1 | 1 |

$N_{user}=1$, 8 comb.

| Nsts[1] |
|---|
| 1~8 |

$N_{user}=2$, 16 comb.

| Nsts[1] | Nsts[2] |
|---|---|
| 1~7 | 1 |
| 2~6 | 2 |
| 3~5 | 3 |
| 4 | 4 |

1772

$N_{user}=3$, 16 comb.

| Nsts[1] | Nsts[2] | Nsts[3] |
|---|---|---|
| 1~6 | 1 | 1 |
| 2~5 | 2 | 1 |
| 3~4 | 2 | 2 |
| 2~4 | 3 | 3 |

$N_{user}=4$, 12 comb.

| Nsts[1] | Nsts[2] | Nsts[3] | Nsts[4] |
|---|---|---|---|
| 1~5 | 1 | 1 | 1 |
| 2~4 | 2 | 1 | 1 |
| 3 | 3 | 1 | 1 |
| 2~3 | 2 | 2 | 1 |
| 2 | 2 | 2 | 2 |

$N_{user}=5$, 6 comb.

| Nsts[1] | Nsts[2] | Nsts[3] | Nsts[4] | Nsts[5] |
|---|---|---|---|---|
| 1~4 | 1 | 1 | 1 | 1 |
| 2~3 | 2 | 1 | 1 | 1 |

$N_{user}=6$, 4 comb.

| Nsts[1] | Nsts[2] | Nsts[3] | Nsts[4] | Nsts[5] | Nsts[6] |
|---|---|---|---|---|---|
| 1~3 | 1 | 1 | 1 | 1 | 1 |
| 2 | 2 | 1 | 1 | 1 | 1 |

$N_{user}=7$, 2 comb.

| Nsts[1] | Nsts[2] | Nsts[3] | Nsts[4] | Nsts[5] | Nsts[7] |
|---|---|---|---|---|---|
| 1~2 | 1 | 1 | 1 | 1 | 1 |

$N_{user}=8$, 1 comb.

| Nsts[1] | Nsts[2] | Nsts[3] | Nsts[4] | Nsts[5] | Nsts[7] | Nsts[8] |
|---|---|---|---|---|---|---|
| 1 | 1 | 1 | 1 | 1 | 1 | 1 |

*Fig. 17C*

DOWNLINK SIGNALING IN A HIGH EFFICIENCY WIRELESS LOCAL AREA NETWORK (WLAN)

CROSS-REFERENCES TO RELATED APPLICATIONS

This disclosure claims the benefit of the following U.S. Provisional Patent Applications:

U.S. Provisional Patent Application No. 62/101,100, entitled "Downlink Signaling for High Efficiency WiFi," filed on Jan. 8, 2015;

U.S. Provisional Patent Application No. 62/148,666, entitled "Downlink Signaling for High Efficiency WiFi," filed on Apr. 16, 2015;

U.S. Provisional Patent Application No. 62/184,420, entitled "Downlink Signaling for High Efficiency WiFi," filed on Jun. 25, 2015;

U.S. Provisional Patent Application No. 62/191,663, entitled "Downlink Signaling for High Efficiency WiFi," filed on Jul. 13, 2015;

U.S. Provisional Patent Application No. 62/199,060, entitled "Downlink Signaling for High Efficiency WiFi," filed on Jul. 30, 2015; and U.S. Provisional Patent Application No. 62/222,509, entitled "Downlink Signaling for High Efficiency WiFi," filed on Sep. 23, 2015.

The disclosures of all of the above-referenced patent applications are hereby incorporated by reference herein in their entireties.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, 802.11n, and 802.11ac Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for generating a physical layer (PHY) data unit for transmission via a communication channel includes generating a first signal field to include multiple copies of first signal field content, wherein the first signal field content spans one sub-band of a plurality of sub-bands of the PHY data unit, and wherein the multiple copies collectively span the plurality of sub-bands of the PHY data unit. The method also includes generating a second signal field to include multiple copies of second signal field content, wherein the second signal field content spans multiple ones of the plurality of sub-bands of the PHY data unit, and wherein the multiple copies of the second signal field collectively span the plurality of sub-bands of the PHY data unit. The method additionally includes generating a preamble of the PHY data unit to include at least the first signal field and the second signal field, and generating the PHY data unit to include at least the preamble.

In another embodiment, an apparatus comprises a network interface device having one or more integrated circuits configured to generate a first signal field to include multiple copies of first signal field content, wherein the first signal field content spans one sub-band of a plurality of sub-bands of the PHY data unit, and wherein the multiple copies collectively span the plurality of sub-bands of the PHY data unit. The one or more integrated circuits are also configured to generate a second signal field to include multiple copies of second signal field content, wherein the second signal field content spans multiple ones of the plurality of sub-bands of the PHY data unit, and wherein the multiple copies of the second signal field collectively span the plurality of sub-bands of the PHY data unit. The one or more integrated circuits are additionally configured to generate a preamble of the PHY data unit to include at least the first signal field and the second signal field, and generate the PHY data unit to include at least the preamble.

BRIEF DESCRIPTION OF THE DRAWINGS

FIGS. 11A-11F are block diagrams of example punctured signal field configurations, according to several embodiments;

FIGS. 16A and 16B are block diagrams of user blocks that correspond to a multi-user multiple input multiple output (MU-MIMO) resource unit and a single user (SU) resource unit, respectively, according to an embodiment;

FIGS. 16C and 16D are block diagrams of user blocks that correspond to an MU-MIMO resource unit and an SU resource unit, respectively, according to another embodiment;

FIG. 17A illustrates possible spatial stream allocation combinations, according to an embodiment;

FIG. 17B illustrates a table that lists correspondence between values of bits of an subfield of a signal field and spatial stream allocation combinations, according to an embodiment;

FIG. 17C illustrates possible spatial stream allocation combinations, according to another embodiment;

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred herein as "high efficiency WiFi," "HEW" communication protocol, "HE" communication protocol, or IEEE 802.11ax communication protocol. In an embodiment, the first communication protocol supports orthogonal frequency division (OFDM) communication in both downlink direction from the AP to one or more client station and uplink direction from one or more client stations to the AP. In an embodiment, the first communication protocol supports a single user (SU) mode, in which the AP transmits a data unit to one client station, or receives a data unit from one client station, at any given time. The first communication protocol also supports one or more multi-user (MU) modes in which the AP transmits multiple independent data streams simultaneously to multiple client stations, or receives independent data units simultaneously transmitted by multiple client stations, in some embodiments. Multi-user transmission to, or by, multiple client stations is performed using MU multiple input multiple output (MU-MIMO) transmission in which respective spatial streams are used for transmission to, or by, respective ones of the multiple client stations and/or using orthogonal frequency division multiple access (OFDMA) transmission in which respective frequency sub-channels of a communication channel are used for simultaneous transmission to, or by, respective ones of multiple client stations, in various embodiments.

In various embodiments, a data unit transmitted in the downlink direction from the AP to one or more client stations 25 ("DL data unit"), or a data unit transmitted in the uplink direction from a client station to the AP ("UL data unit"), includes one or more signal fields that include formatting and/or control information needed at the receiving device to properly receive and decode the data unit. In various embodiments, the formatting and/or control information is distributed among multiple signal fields, included in the data unit, for efficient transmission of the formatting and/or control information from a transmitting device (e.g., the AP) to one or more receiving devices (e.g., one or more client stations). The efficient distribution of the formatting and/or control information among the multiple signal fields, and the specific contents of each of the multiple signal fields enable receiving devices to efficiently receive and process the data unit and/or to quickly discard the data unit (e.g., if a receiving device is not an intended recipient of the data unit), in at least some embodiments.

Figure 1:
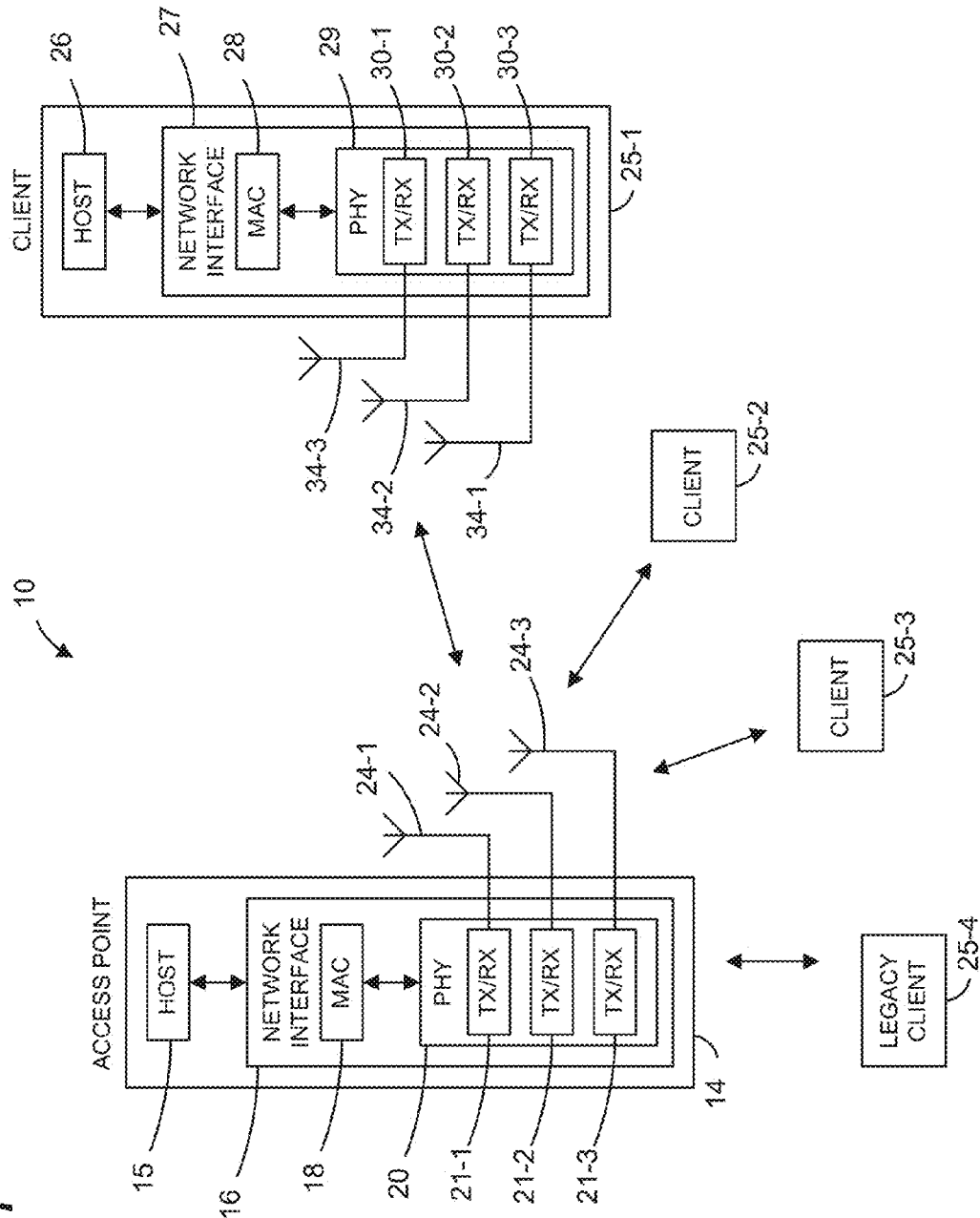
FIG. 1 is a block diagram of an example wireless local area network (WLAN), according to an embodiment.

FIG. 1 is a block diagram of an example wireless local area network (WLAN) 10, according to an embodiment. The WLAN 10 supports downlink (DL) and uplink (UL) multiuser (MU) multiple-input and multiple-output (MIMO) communication between an access point (AP) and a plurality of client stations. Additionally, the WLAN 10 supports DL and UL single-user (SU) communication between the AP and each of a plurality of client stations. The WLAN 10 includes an AP 14, and the AP 14, in turn, includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In an embodiment, the network interface device 16 includes one or more integrated circuit (IC) devices. For example, at least some of the functionality of the MAC processing unit 18 and at least some of the functionality of the PHY processing unit 20 are implemented on a single IC device, according to an embodiment. As another example, at least some of the functionality of the MAC processing unit 18 is implemented on a first IC device, and at least some of the functionality of the PHY processing unit 20 is implemented on a second IC device, according to an embodiment.

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to a legacy communication protocol (referred to herein as a "legacy client station").

The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. A client station 25-1 includes a host processor 26 coupled to a network interface 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments. In an embodiment, the network interface device 27 includes one or more IC devices. For example, at least some of the functionality of the MAC processing unit 28 and at least some of the functionality of the PHY processing unit 29 are implemented on a single IC device, according to an embodiment. As another example, at least some of the functionality of the MAC processing unit 28 is implemented on a first IC device, and at least some of the functionality of the PHY processing unit 29 is implemented on a second IC device, according to an embodiment.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to a legacy communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol and having formats described herein and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna (s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

In an embodiment, when operating in single-user mode, the AP 14 transmits a data unit to a single client station 25 (DL SU transmission), or receives a data unit transmitted by a single client station 25 (UL SU transmission), without simultaneous transmission to or, by, any other client station 25. When operating in multi-user mode, the AP 14 transmits a data unit that includes multiple data streams for multiple client stations 25 (DL MU transmission), or receives data units simultaneously transmitted by multiple client stations 25 (UL MU transmission), in an embodiment. For example, in multi-user mode, a data unit transmitted by the AP 14 includes multiple data streams simultaneously transmitted by the AP 14 to respective client stations 25 using respective spatial streams allocated for simultaneous transmission to the respective client stations 25 and/or using respective sets of OFDM tones corresponding to respective frequency sub-channels allocated for simultaneous transmission to the respective client stations.

Figure 2:
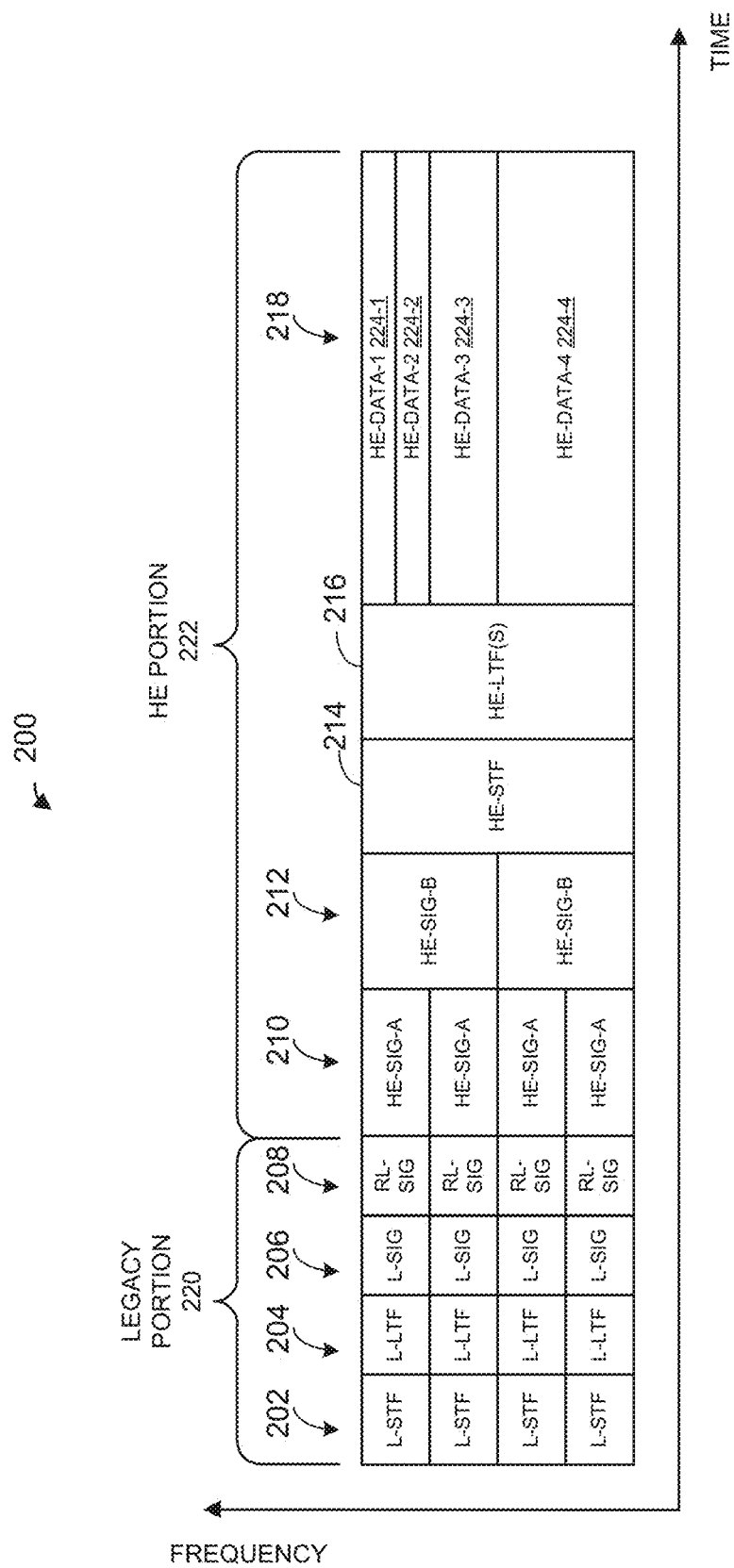
FIGS. 2-10 are diagrams of physical layer (PHY) data units, according various embodiments.

FIG. 2 is a diagram of a physical layer (PHY) data unit 200 that the AP 14 is configured to transmit to one or more client stations 25 (e.g., the client stations 25-1), according to an embodiment. The data unit 200 conforms to the HE communication protocol and occupies an 80 MHz bandwidth. Data units similar to the data unit 200 occupy other suitable bandwidth such as 20 MHz, 40 MHz, 160 MHz, 320 MHz, 640 MHz, for example, or other suitable bandwidths, in other embodiments. The data unit 200 is suitable for "mixed mode" situations, i.e. when the WLAN 10 includes a client station (e.g., the legacy client station 24-4) that conforms to a legacy communication protocol, but not the first communication protocol. The data unit 200 is utilized in other situations as well, in some embodiments.

In various embodiments and/or scenarios, the data unit 200 is a downlink (DL) orthogonal frequency division multiple access (OFDMA) unit in which independent data streams are transmitted to multiple client stations 25 using respective sets of OFDM tones and, in some cases respective spatial streams, allocated to the client stations 25. Similarly, in various embodiments and/or scenarios, the data unit 200 is an uplink (UL) OFDMA data unit transmitted by a particular client station 25 as part of an OFDMA uplink transmission by multiple client stations 25, wherein each of the multiple client stations 25 transmits data using a set of OFDM tones and, in some cases, respective one or more spatial streams, allocated to the client station 25. For example, in an embodiment, available OFDM tones (e.g., OFDM tones that are not used as DC tone and/or guard tones) are partitioned into multiple resource units (RUs), and each of the multiple RUs is allocated to one or more client stations 25 for transmission of data to, or by, the one or more of the client stations 25. In an embodiment, allocation of OFDM tones is performed using basic resource unit blocks defined by the first communication protocol. A basic resource unit block is sometimes referred to herein as simply a "basic resource unit." For example, a basic resource unit includes K OFDM tones, wherein K is an integer greater than zero, each allocated resource unit is comprised of one or more K-OFDM tone basic resource units. As just an example, K=26, in an embodiment. Accordingly, a basic resource unit includes 26 OFDM tones, in this embodiment. A resource unit allocated to a client station 25, or allocated to a multi-user group of client stations 25, includes a number of OFDM tones that is an integer multiple of 26 OFDM tones, such as 26 OFDM tones, 52 OFDM tones, 78 OFDM tones, etc., in this embodiment. In another embodiment, K is any suitable integer other than 26, and a basic resource unit includes a corresponding number of OFDM tones other than 26.

The data unit 200 includes a preamble including a legacy short training field (L-STF) 202, a legacy long training field (L-LTF) 204, a legacy signal field (L-SIG) 206, a replicated legacy signal field (RL-SIG) 208, a first HE signal field (HE-SIG-A) 210, a second HE signal field (HE-SIG-B) 212, an HE short training field (HE-STF) 214, and one or more HE long training fields (HE-LTF(s)) 216. In some embodiments and/or scenarios, the data unit 200 also includes a data portion 218. In some embodiments and/or scenarios, the data unit 200 omits the data portion 218. The L-STF 202, L-LTF 204, L-SIG 206 and RL-SIG 208 form a legacy portion 220 of the data unit 200, in an embodiment. HE-SIG-A 210, HE-SIG-B 212, HE-STF 214, HE-LTF(s) 216 and HE-DATA 218 form an HE portion 222 of the data unit 200, in an embodiment. The HE-SIG-B 212 is positioned in the data unit 200 such that the HE-SIG-B 212 immediately follows the HE-SIG-A 210, in an embodiment. The HE-SIG-B 212 is positioned in the data unit 200 such that the HE-SIG-B 212 will be transmitted before the HE-STF 214 and the HE-LTF(s) 216, in an embodiment.

In the embodiment of FIG. 2, the L-STF 202, the L-LTF 204, the L-SIG 206 and the RL-SIG 208 is duplicated in each of four 20 MHz sub-bands of the data unit 200. the Accordingly, the data unit 200 includes four of each of the L-STF 202, the L-LTF 204, the L-SIG 206, and RL-SIG 208. In other embodiments in which a data unit similar to the data unit 200 occupies a cumulative bandwidth other than 80

MHz, each of the L-STF 202, the L-LTF 204, the L-SIG 206, and the RL-SIG 208 is duplicated over a corresponding number of 20 MHz sub-bands of the whole bandwidth of the data unit. For example, in an embodiment, the data unit occupies a 160 MHz bandwidth and, accordingly, includes eight of each of the each of the L-STF 202, the L-LTF 204, the L-SIG 206, and RL-SIG 208.

In the embodiment of FIG. 2, the HE-SIG-A 210 occupies a 20 MHz bandwidth and is duplicated in each 20 MHz sub-band of the data unit 200. The HE-SIG-B 212, on the other hand, occupies a 40 MHz bandwidth and is duplicated in each of two 40 MHz sub-bands of the data unit 200. Accordingly, the data unit 200 includes four HE-SIG-A fields 210 and two HE-SIG-B fields 212, in the illustrated embodiment. In other embodiments in which a data unit similar to the data unit 200 occupies a cumulative bandwidth other than 80 MHz, each of the HE-SIG-A is duplicated over a corresponding number of 20 MHz sub-bands of the whole bandwidth of the data unit and the HE-SIG-B 212 is duplicated over a corresponding number of 40 MHz sub-bands of the whole bandwidth of the data unit. For example, in an embodiment, the data unit occupies a 160 MHz bandwidth and, accordingly, includes eight of the HE-SIG-A 210 and four of the HE-SIG-B 212.

In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is a data unit that occupies a cumulative bandwidth such as 20 MHz, 40 MHz, 80 MHz, 160 MHz, 320 MHz, 640 MHz, etc., the HE-STF 214 and the HE-LTF(s) 216 occupy the corresponding whole bandwidth of the data unit.

In an embodiment, the data portion 218 includes four frequency portions 224 corresponding to four resource units allocated for transmission of data to client stations 25. In an embodiment, a frequency portion 224 corresponds to a resource unit allocated for SU transmission to a single client station 25 or to a resource unit allocated for MU-MIMO transmission to multiple client stations 25. Although the data portion 218 includes four frequency portions 224 in the illustrated embodiment, the data portion 218 includes another suitable number of frequency portions 224 (e.g., 1, 2, 3, 5, 6, 7, 8, 9, 10, 11, 12, etc.), in other embodiments. Generally, the data portion 218 includes any suitable number of frequency portions, with each frequency portion corresponding to a resource unit allocated for transmission of data to any suitable number of client stations, in various embodiments.

In an embodiment, the HE-SIG-A 210 and the HE-SIG-B 212 generally carry information about the format of the data unit 200, such as information needed to properly decode at least a portion of the data unit 200, in an embodiment. In an embodiment in which the data unit 200 is a multi-user data unit, HE-SIG-A 210 carries information commonly needed by multiple intended receivers of the data unit 200. In some embodiments, HE-SIG-A 210 additionally includes information for client stations 25 that are not intended receivers of the data unit 200, such as information needed for medium protection from the client stations 25 that are not receivers of the data unit 200. On the other hand, HE-SIG-B 212 carries user-specific information individually needed by each client station 25 that is an intended recipient of the data unit 200, in an embodiment. In an embodiment, HE-SIG-A 210 includes information needed to properly decode HE-SIG-B 212, and HE-SIG-B 212 includes information needed to properly decode data streams in the data portion 218 of the data unit 200. In some embodiments and/or scenarios, however, HE-SIG-A field 210 includes at least some of the information needed to decode the data portion 218.

Figure 3:
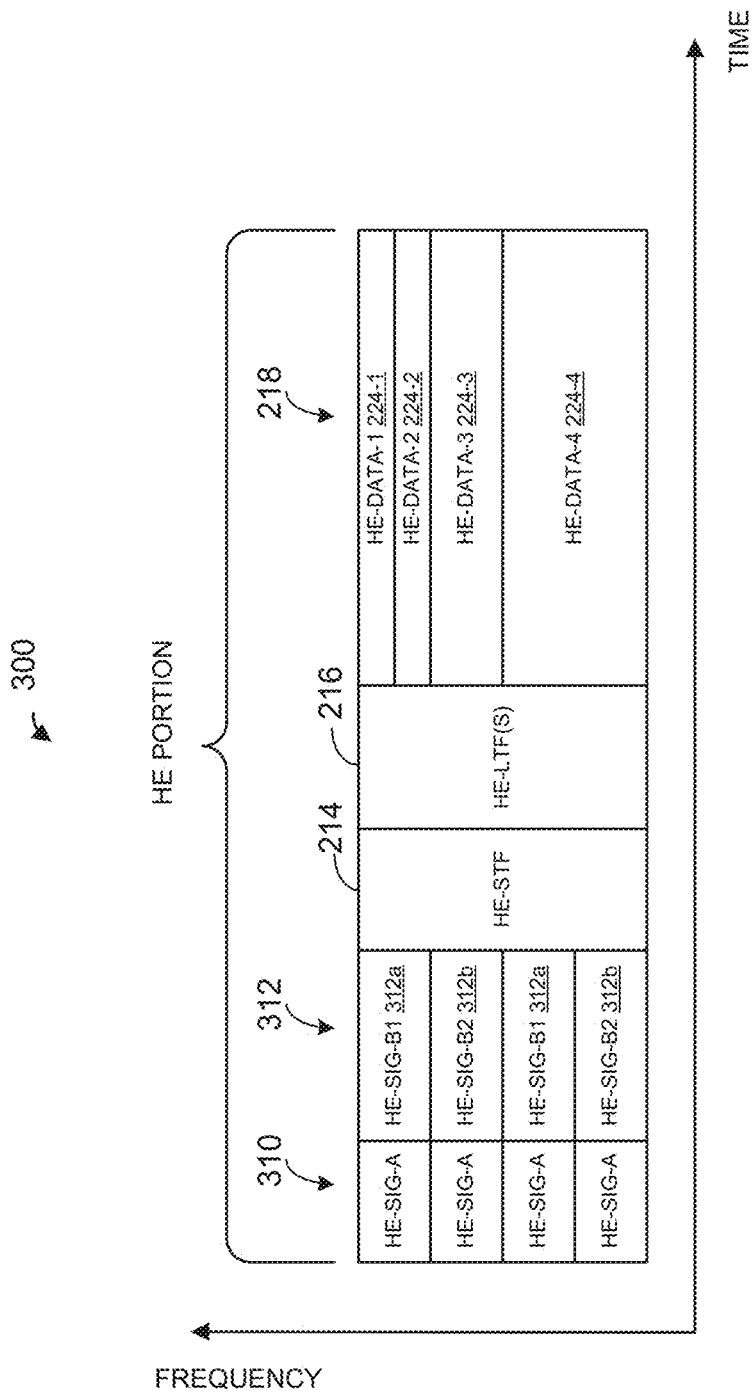

FIG. 3 is a diagram of a PHY data unit 300 that the AP 14 is configured to transmit to one or more client stations 25 (e.g., the client stations 25-1), according to an embodiment. The data unit 300 conforms to the HE communication protocol and occupies an 80 MHz bandwidth. Data units similar to the data unit 300 occupy other suitable bandwidth such as 20 MHz, 40 MHz, 160 MHz, 320 MHz, 640 MHz, for example, or other suitable bandwidths, in other embodiments. The data unit 300 is similar to the data unit 200 of FIG. 2 and includes many of the same-numbered elements with the data unit 200 of FIG. 2. For conciseness of illustration, the data unit 300 is illustrated without a legacy portion. However, the data unit 300 includes a legacy portion, such as the legacy portion 220 of FIG. 2, in some embodiments.

The data unit 300 includes a first HE signal field HE-SIG-A 310 that is duplicated in each 20 MHz sub-band of the data unit 300, and a second HE signal field HE-SIG-B 312. The HE-SIG-B 312 includes a portion that occupies a 40 MHz bandwidth and is duplicated in each 40 MHz sub-band of the data unit 300. The duplicated portion that occupies a 40 MHz bandwidth includes an HE-SIG-B1 field 312a and an HE-SIG-B2 field 312b, each occupying a 20 MHz sub-band of the 40 MHz bandwidth. Accordingly, the data unit 300 includes two of HE-SIG-B1 fields 312a and two of the HE-SIG-B2 fields 312b, in the illustrated embodiment. In other embodiments in which a data unit similar to the data unit 300 occupies a cumulative bandwidth other than 80 MHz, each of the HE-SIG-A 310 is duplicated over a corresponding number of 20 MHz sub-bands of the whole bandwidth of the data unit and each 40 MHz-wide portion of the HE-SIG-B 312 is duplicated over a corresponding number of 40 MHz sub-bands of the whole bandwidth of the data unit. For example, in an embodiment, the data unit occupies a 160 MHz bandwidth and, accordingly, includes eight of the HE-SIG-A 310 and four of each of the HE-SIG-B1 312a and the HE-SIG-B2 312b. The HE-SIG-B 312 is positioned in the data unit 300 such that the HE-SIG-B 312 immediately follows the HE-SIG-A 310, in an embodiment. The HE-SIG-B 312 is positioned in the data unit 300 such that the HE-SIG-B 312 will be transmitted before the HE-STF 214 and the HE-LTF(s) 216, in an embodiment.

Figure 4:
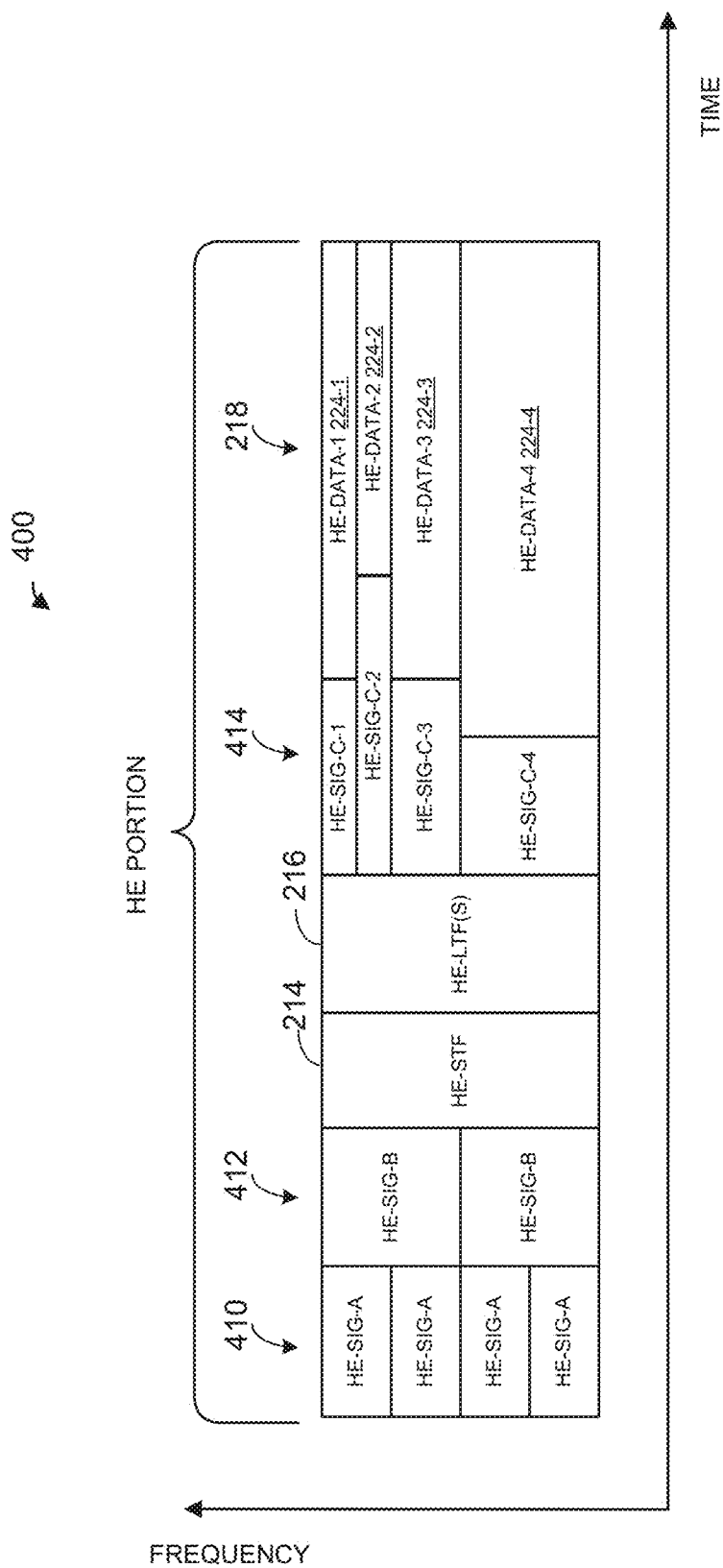

FIG. 4 is a diagram of a PHY data unit 400 that the AP 14 is configured to transmit to one or more client stations 25 (e.g., the client stations 25-1), according to an embodiment. The data unit 400 conforms to the HE communication protocol and occupies an 80 MHz bandwidth. Data units similar to the data unit 400 occupy other suitable bandwidth such as 20 MHz, 40 MHz, 160 MHz, 320 MHz, 640 MHz, for example, or other suitable bandwidths, in other embodiments. The data unit 400 is similar to the data unit 200 of FIG. 2 and includes many of the same-numbered elements with the data unit 200 of FIG. 2. For conciseness of illustration, the data unit 400 is illustrated without a legacy portion. However, the data unit 400 includes a legacy portion, such as the legacy portion 220 of FIG. 2, in some embodiments.

The data unit 400 includes a first HE signal field HE-SIG-A 410 that is duplicated in each 20 MHz sub-band of the data unit 400, and a second HE signal field HE-SIG-B 412 that is duplicated in each 40 MHz sub-band of the data unit 400. Additionally, the data unit 400 includes a third signal field HE-SIG-C 414. The third signal field HE-SIG-C 414 includes a plurality of portions respectively corresponding to frequency portions 224 of the data portion 218 of the data unit 400. In an embodiment, a particular portion of the HE-SIG-C 414 that corresponds to a particular frequency portion 224 is transmitted in the same sub-channel as the corresponding frequency portion 224. In an embodiment, a particular portion of the HE-SIG-C 414 that corresponds to a particular frequency portion 224 includes information needed to decode the corresponding frequency portion 224. The HE-SIG-B 412 is positioned in the data unit 400 such that the HE-SIG-B 412 immediately follows the HE-SIG-A 410, in an embodiment. The HE-SIG-B 412 is positioned in the data unit 400 such that the HE-SIG-B 412 will be transmitted before the HE-STF 214 and the HE-LTF(s) 216, in an embodiment. The HE-SIG-C 414 is positioned in the data unit 400 such that the HE-SIG-C 414 will be transmitted after the HE-STF 214 and the HE-LTF(s) 216, in an embodiment.

Figure 5:
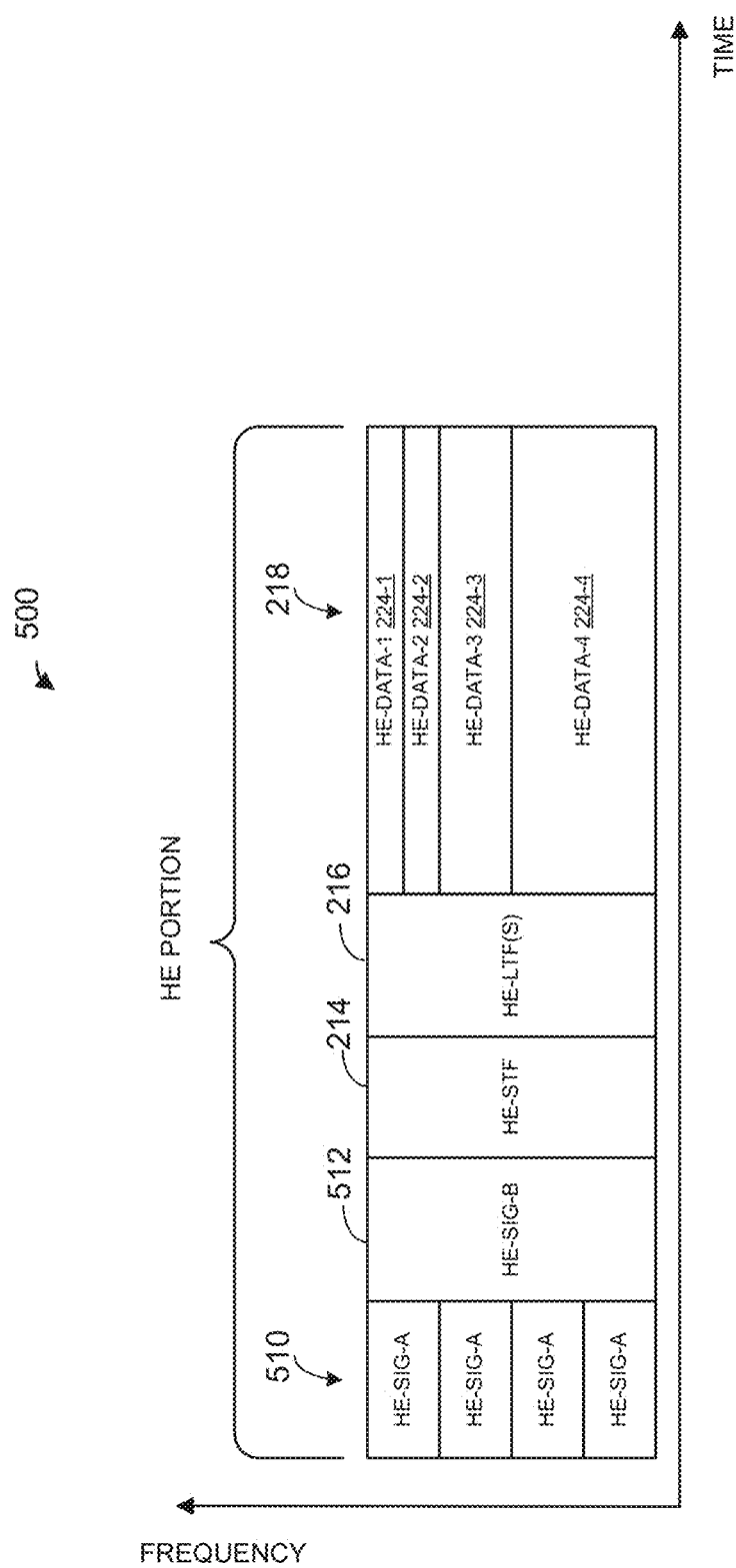

FIG. 5 is a diagram of a PHY data unit 500 that the AP 14 is configured to transmit to one or more client stations 25, according to an embodiment. The data unit 500 conforms to the HE communication protocol and occupies an 80 MHz bandwidth. Data units similar to the data unit 500 occupy other suitable bandwidth such as 20 MHz, 40 MHz, 160 MHz, 320 MHz, 640 MHz, for example, or other suitable bandwidths, in other embodiments. The data unit 500 is similar to the data unit 200 of FIG. 2 and includes many of the same-numbered elements with the data unit 200 of FIG. 2. For conciseness of illustration, the data unit 500 is illustrated without a legacy portion. However, the data unit 500 includes a legacy portion, such as the legacy portion 220 of FIG. 2, in some embodiments.

The data unit 500 includes a first HE signal field HE-SIG-A 510 that is duplicated in each 20 MHz sub-band of the data unit 500, and a second HE signal field HE-SIG-B 512 that occupies the entire bandwidth of the data unit 500. The HE-SIG-B 512 is positioned in the data unit 500 such that the HE-SIG-B 512 immediately follows the HE-SIG-A 510, in an embodiment. The HE-SIG-B 512 is positioned in the data unit 500 such that the HE-SIG-B 512 will be transmitted before the HE-STF 214 and the HE-LTF(s) 216, in an embodiment.

Figure 6:
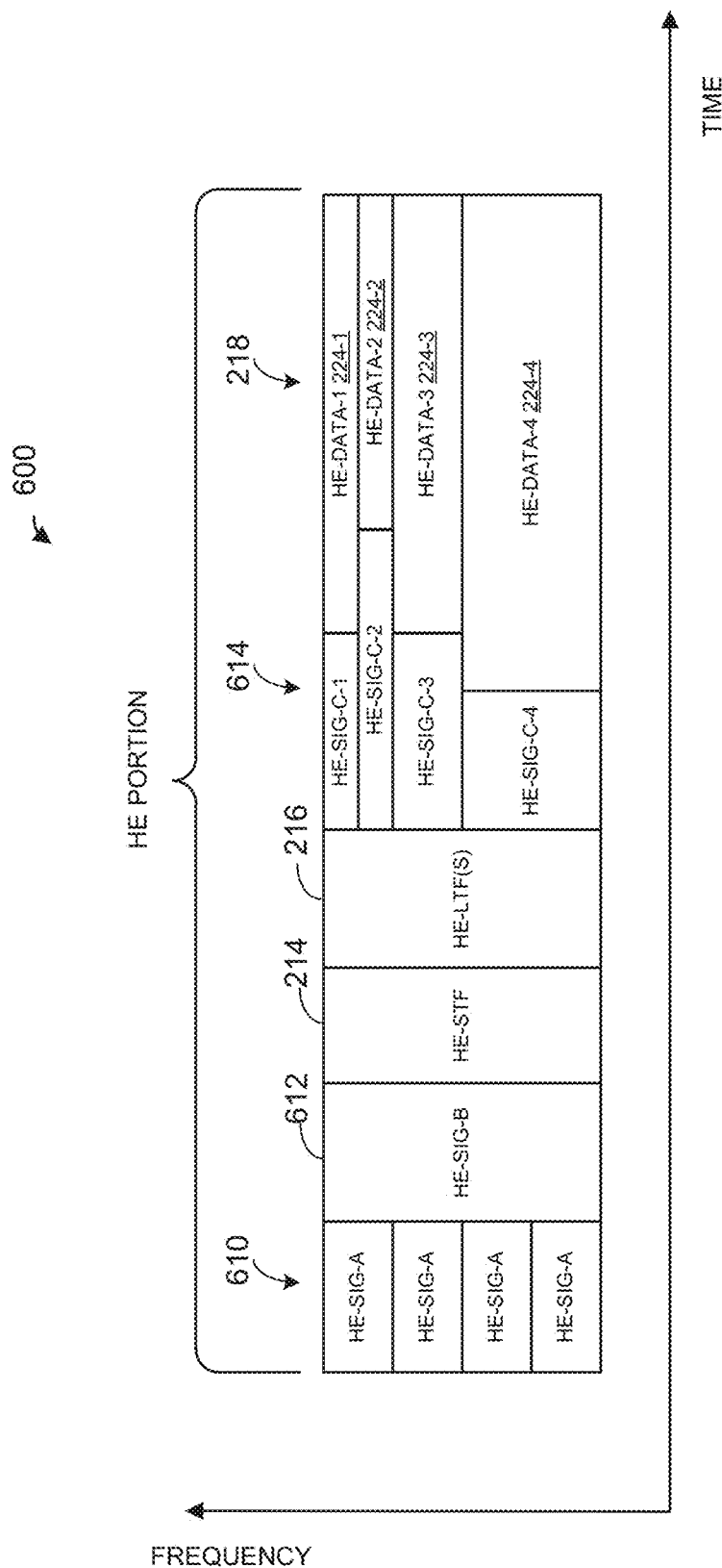

FIG. 6 is a diagram of a PHY data unit 600 that the AP 14 is configured to transmit to one or more client stations 25, according to an embodiment. The data unit 600 conforms to the HE communication protocol and occupies an 80 MHz bandwidth. Data units similar to the data unit 600 occupy other suitable bandwidth such as 20 MHz, 40 MHz, 160 MHz, 320 MHz, 640 MHz, for example, or other suitable bandwidths, in other embodiments. The data unit 600 is similar to the data unit 200 of FIG. 2 and includes many of the same-numbered elements with the data unit 200 of FIG. 2. For conciseness of illustration, the data unit 600 is illustrated without a legacy portion. However, the data unit 600 includes a legacy portion, such as the legacy portion 220 of FIG. 2, in some embodiments.

The data unit 600 includes a first HE signal field HE-SIG-A 610 that is duplicated in each 20 MHz sub-band of the data unit 600, and a second HE signal field HE-SIG-B 612 that spans the entire bandwidth of the data unit 600. Additionally, the data unit 600 includes a third signal field HE-SIG-C 614. The third signal field HE-SIG-C 614 includes a plurality of frequency portions respectively corresponding to frequency portions 224 of the data portion 218 of the data unit 400. In an embodiment, a particular frequency portion of the HE-SIG-C 614 that corresponds to a particular frequency portion 224 is transmitted in the same sub-channel (e.g., same resource unit) as the corresponding frequency portion 224. In an embodiment, a particular frequency portion of the HE-SIG-C 614 that corresponds with a particular frequency portion 224 of the data portion 218 includes information needed to decode the corresponding frequency portion 224. The HE-SIG-B 612 is positioned in the data unit 600 such that the HE-SIG-B 612 immediately follows the HE-SIG-A 610, in an embodiment. The HE-SIG-B 612 is positioned in the data unit 600 such that the HE-SIG-B 612 will be transmitted before the HE-STF 214 and the HE-LTF(s) 216, in an embodiment. The HE-SIG-C 614 is positioned in the data unit 600 such that the HE-SIG-C 614 will be transmitted after the HE-STF 214 and the HE-LTF(s) 216, in an embodiment.

Figure 7:
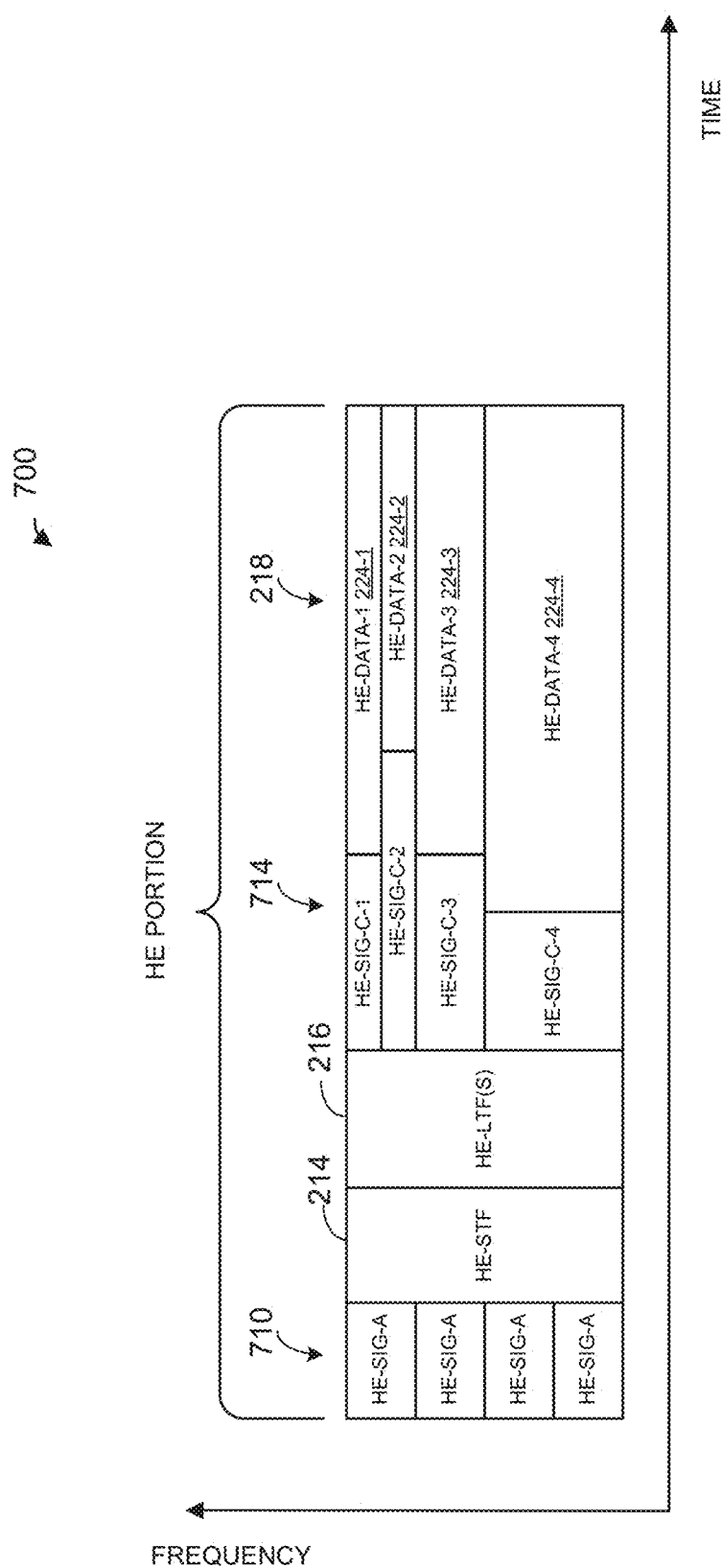

FIG. 7 is a diagram of a PHY data unit 700 that the AP 14 is configured to transmit to one or more client stations 25, according to an embodiment. The data unit 700 conforms to the HE communication protocol and occupies an 80 MHz bandwidth. Data units similar to the data unit 700 occupy other suitable bandwidth such as 20 MHz, 40 MHz, 160 MHz, 320 MHz, 640 MHz, for example, or other suitable bandwidths, in other embodiments. The data unit 700 is similar to the data unit 200 of FIG. 2 and includes many of the same-numbered elements with the data unit 200 of FIG. 2. For conciseness of illustration, the data unit 700 is illustrated without a legacy portion. However, the data unit 700 includes a legacy portion, such as the legacy portion 220 of FIG. 2, in some embodiments.

The data unit 700 includes a first HE signal field HE-SIG-A 610 that is duplicated in each 20 MHz sub-band of the data unit 700, and a second signal field HE-SIG-C 714 that includes a plurality of portions respectively corresponding to frequency portions 224 of the data portion 218 of the data unit 700. In an embodiment, a particular portion of the HE-SIG-C 714 that corresponds to a particular frequency portion 224 is transmitted in the same sub-channel as the corresponding frequency portion 224. In an embodiment, a particular portion of the HE-SIG-C 714 that corresponds to a particular frequency portion 224 includes information needed to decode the corresponding frequency portion 224. The HE-SIG-C 714 is positioned in the data unit 700 such that the HE-SIG-C 714 will be transmitted after the HE-STF 214 and the HE-LTF(s) 216, in an embodiment.

Figure 8:
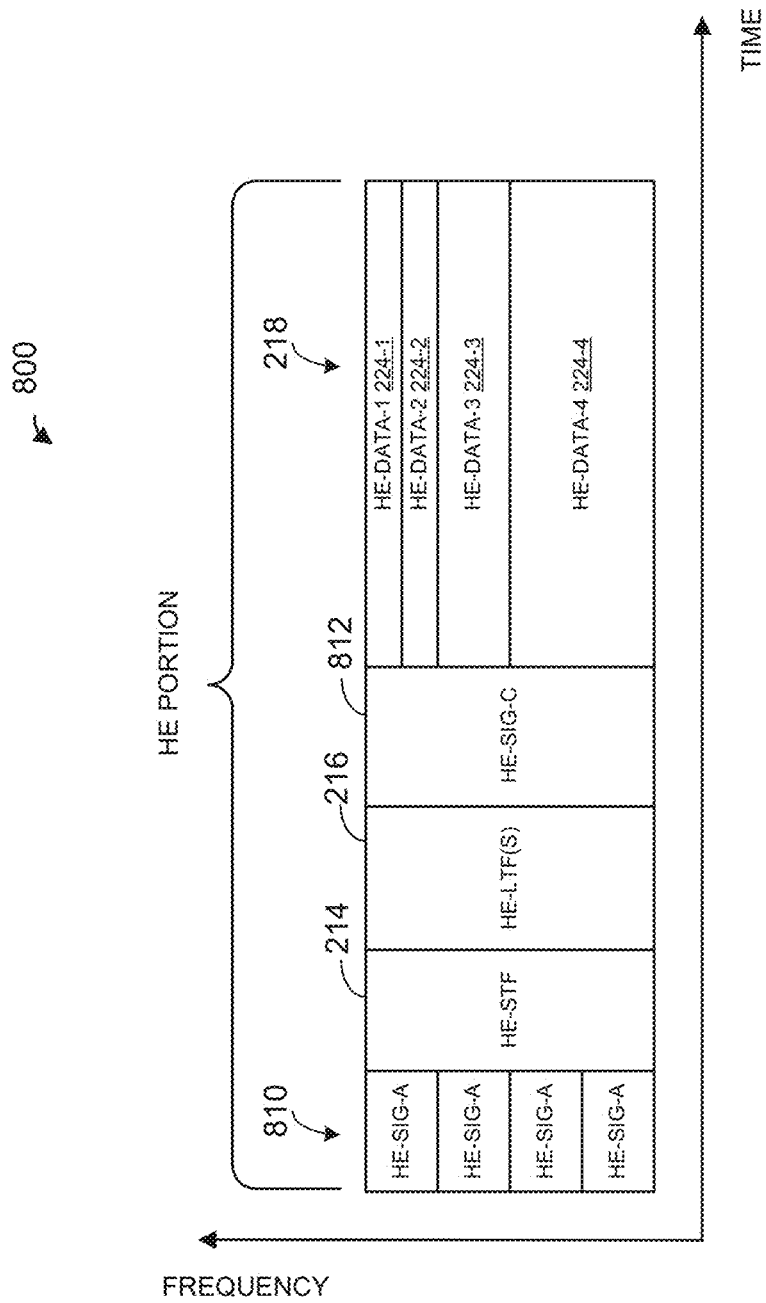

FIG. 8 is a diagram of a PHY data unit 800 that the AP 14 is configured to transmit to one or more client stations 25, according to an embodiment. The data unit 800 conforms to the HE communication protocol and occupies an 80 MHz bandwidth. Data units similar to the data unit 800 occupy other suitable bandwidth such as 20 MHz, 40 MHz, 160 MHz, 320 MHz, 640 MHz, for example, or other suitable bandwidths, in other embodiments. The data unit 800 is similar to the data unit 200 of FIG. 2 and includes many of the same-numbered elements with the data unit 200 of FIG. 2. For conciseness of illustration, the data unit 800 is illustrated without a legacy portion. However, the data unit 800 includes a legacy portion, such as the legacy portion 220 of FIG. 2, in some embodiments.

The data unit 800 includes a first HE signal field HE-SIG-A 810 that is duplicated in each 20 MHz sub-band of the data unit 800, and a second signal field HE-SIG-C 814 that occupies the entire bandwidth of the data unit 800. The HE-SIG-C 812 is positioned in the data unit 800 such that the HE-SIG-C 812 will be transmitted after the HE-STF 214 and the HE-LTF(s) 216, in an embodiment.

Figure 9:
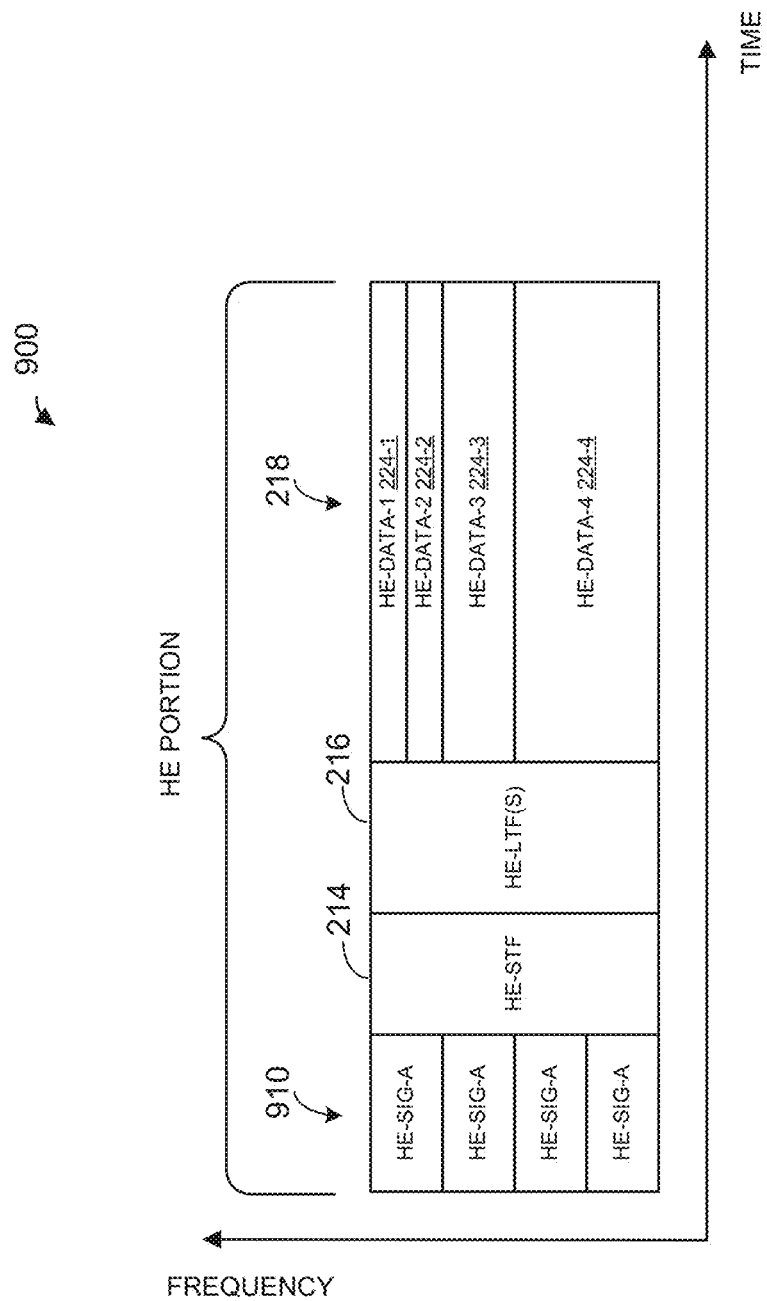

FIG. 9 is a diagram of a PHY data unit 900 that the AP 14 is configured to transmit to one or more client stations 25, according to an embodiment. The data unit 900 conforms to the HE communication protocol and occupies an 80 MHz bandwidth. Data units similar to the data unit 900 occupy other suitable bandwidth such as 20 MHz, 40 MHz, 160 MHz, 320 MHz, 640 MHz, for example, or other suitable bandwidths, in other embodiments. The data unit 900 is similar to the data unit 200 of FIG. 2 and includes many of the same-numbered elements with the data unit 200 of FIG. 2. For conciseness of illustration, the data unit 900 is illustrated without a legacy portion. However, the data unit 900 includes a legacy portion, such as the legacy portion 220 of FIG. 2, in some embodiments. The data unit 900 includes a single HE signal field HE-SIG-A 910 that is duplicated in each 20 MHz sub-band of the data unit 900.

Figure 10:
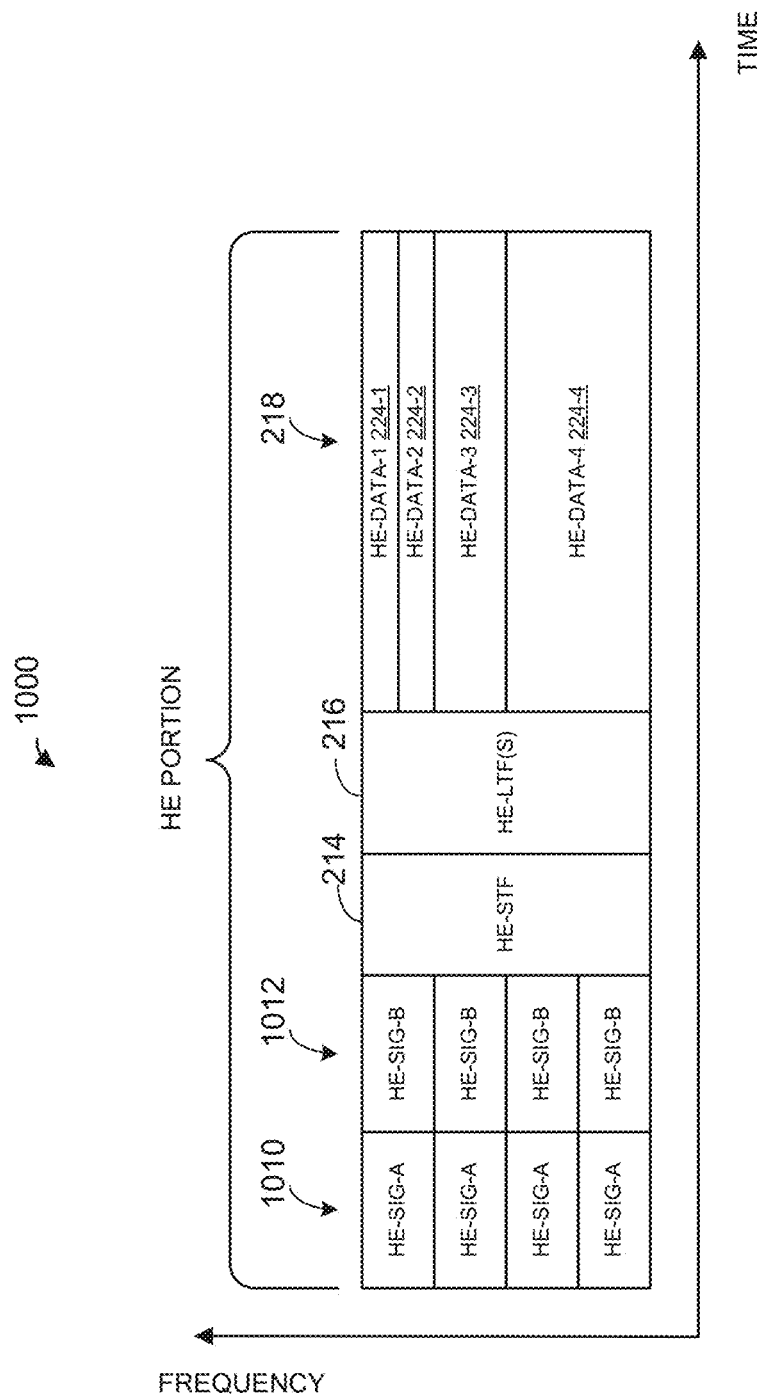

FIG. 10 is a diagram of a PHY data unit 1000 that the AP 14 is configured to transmit to one or more client stations 25, according to an embodiment. The data unit 1000 conforms to the HE communication protocol and occupies an 80 MHz bandwidth. Data units similar to the data unit 800 occupy other suitable bandwidth such as 20 MHz, 40 MHz, 160 MHz, 320 MHz, 640 MHz, for example, or other suitable bandwidths, in other embodiments. The data unit 1000 is similar to the data unit 200 of FIG. 2 and includes many of the same-numbered elements with the data unit 200 of FIG. 2. For conciseness of illustration, the data unit 1000 is illustrated without a legacy portion. However, the data unit 1000 includes a legacy portion, such as the legacy portion 220 of FIG. 2, in some embodiments.

The data unit 1000 includes a first HE signal field HE-SIG-A 1010 that is duplicated in each 20 MHz sub-band of the data unit 1000, and a second signal field HE-SIG-B 1012 that is duplicated in each 20 MHz sub-band of the data unit 1000. The HE-SIG-B 1012 is positioned in the data unit 1000 such that the HE-SIG-B 1012 immediately follows the HE-SIG-A 1010, in an embodiment. The HE-SIG-B 1012 is positioned in the data unit 1000 such that the HE-SIG-B 1012 will be transmitted before the HE-STF 214 and the HE-LTF(s) 216, in an embodiment.

In some embodiments in which a signal field is duplicated in multiple sub-bands of a data unit, one copies of the signal field are distributed in any suitable manner over the sub-bands of the data unit. For example, in an embodiment in which an 80 MHz-wide data unit includes a duplicated 40 MHz HE-SIG-B field such as the HE-SIG-B 212 of FIG. 2, for example, a first copy of the 40 MHz HE-SIG-B is included in the sub-bands corresponding to the primary 20 MHz channel ("P20") of the WLAN 10 and the secondary 20 MHz channel ("S20") of the WLAN 10, and a second copy of the 40 MHz HE-SIG-B is included in the sub-bands corresponding to the secondary 40 MHz channel of the WLAN 10. As another example, in another embodiment in which an 80 MHz-wide data unit includes a duplicated 40 MHz HE-SIG-B, a first copy of the HE-SIG-B is included in the sub-band corresponding to P20 and one of the 20 MHz channels in S40, and a second copy is included in the sub-bands corresponding to S20 and the other one of the 20 MHz channels in S40. In some such embodiments, the particular sub-band configuration in which the copies of HE-SIG-B are transmitted is fixed. Alternatively, the particular sub-bands in which the copies of HE-SIG-B are transmitted are adaptively selected (e.g., by the AP 14), and are explicitly or implicitly signaled to receiving devices, in some embodiments. In an embodiment, a selected sub-band configuration for one or more data units is signaled by a management or a control frame transmitted by the AP 14 prior to transmission of the one or more data units, or is signaled in the preamble (e.g., in L-SIG field, SIG-A field, etc.), of the one or more data units. Additionally or alternatively, the selected sub-band configuration is signaled implicitly by particular modulation (e.g., binary phase shift keying (BPSK) or quadrature BPSK (Q-BPSK)) of one or more fields (e.g., in L-SIG field, in SIG-A field, etc.) in the preamble of each of the one or more data units.

In some embodiments in which a signal field is duplicated in multiple sub-bands of a data unit, the signal field is only partially transmitted in some scenarios. In other words, a portion of a signal field is "punctured" from the data unit, in such embodiments and/or scenarios. For example, a portion of a signal field is punctured from a data unit when a certain sub-channel of the WLAN 10 is busy, and the AP 14 transmits data to one or more client stations 25 using resource units in other one(s) of the sub-channels of the WLAN 10. In this case, portions of the data unit corresponding to the busy sub-channel, including signal field(s) corresponding to the busy sub-channel, are "punctured" from the data unit and are not transmitted by the AP 14, in an embodiment. For example, referring to FIG. 2, the data unit 200 includes only one copy of the HE-SIG-B 212, or includes only a portion one or both of the copies of the HE-SIG-B 212, in some embodiments and/or scenarios. As another example, referring to FIG. 3, the data unit 300 includes only one copy of the HE-SIG-B1 312*a* and/or only one copy of the HE-SIB-B2 312*b*, in some embodiments and/or scenarios.

FIGS. 11A-11F are block diagrams of example punctured signal field configurations, according to several embodiments. For ease of explanation, illustrated signal field configurations correspond to an 80 MHz channel. More specifically, punctured transmission of the HE-SIG-B 212 of FIG. 2 in an 80 MHz channel is illustrated. However, the same or similar puncturing techniques are used with other data units and/or other channel bandwidths, in some embodiments. Referring first to FIG. 11A, only a portion 1102 of a first copy of HE-SIG-B included in sub-bands corresponding to P20 and S20 of the WLAN 10 is transmitted, in the illustrated embodiment. In particular, in the first copy of the HE-SIG-B, the portion that corresponds to S20 is punctured from the data unit, in the illustrated embodiment. Referring now to FIG. 11B, only a portion 1104 of a second copy of HE-SIG-B included in sub-bands corresponding to S40 (S40-A and S40-B) of the WLAN 10 is transmitted, in the illustrated embodiment. In particular, in the second copy of the HE-SIG-B, the portion that corresponds to S40-A is punctured from the data unit, in the illustrated embodiment. Referring now to FIG. 11B, only a portion 1106 of a second copy of HE-SIG-B included in sub-bands corresponding to S40 (S40-A and S40-B) of the WLAN 10 is transmitted, in the illustrated embodiment. In particular, in the second copy of the HE-SIG-B, the portion that corresponds to S40-B is punctured from the data unit, in the illustrated embodiment.

In the embodiments of FIGS. 11A-11C, signal field puncturing is performed such that a complete HE-SIG-B is always included in consecutive sub-bands of the data unit. In another embodiment, a complete HE-SIG-B can be distributed among non-consecutive sub-bands of the data unit. FIG. 11D is a block diagrams of example punctured signal field configuration in which a complete HE-SIG-B is distributed among non-consecutive sub-bands of the data unit, according to an embodiment. Non-consecutive portions 1108 of and 1110 of the HE-SIG-B form a complete HE-SIG-B field, in the illustrated embodiment. In some embodiments and/or scenarios, signal field puncturing is performed for more than one sub-band of the data unit. FIGS. 11E-11F are block diagrams of example punctured signal field configurations in which the signal field is punctured in two sub-bands of the data unit, according to several embodiments.

In an embodiment in which only a portion of a signal field is included in a data unit, the portion of the signal field includes a corresponding portion of information bits of the signal field. In another embodiment in which only a portion of a signal field is included in a data unit, the portion of the signal field is modulated using a higher MCS as compared to the MCS used for a complete copy of the signal field. In an embodiment, the MCS used for the portion of the signal field is sufficiently high such that all of the information bits of the signal field are included in the transmitted portion of the signal field. As an example, referring to FIG. 11A, the portion 1102 of the HE-SIG-B field includes half of the information bits of the HE-SIG-B, and the second copy of the HE-SIG-B field includes all of the information bits of the HE-SIG-B field, in an embodiment. In another embodiment, the portion 1102 of the HE-SIG-B field and the second copy of the HE-SIG-B field each includes all of the information bits of the HE-SIG-B field, wherein a higher MCS is used at least for the portion 1102 such that all information bits of the 40 MHz-wide HE-SIG-B field are transmitted in the 20 MHz sub-band of the data unit.

Figure 12:
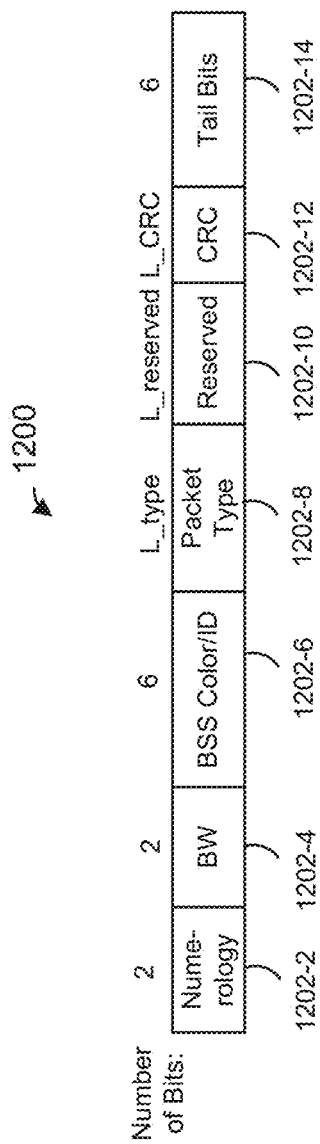
FIG. 12 is a bock diagram of a signal field, according to an embodiment.

FIG. 12 is a bock diagram of a signal field 1200, according to an embodiment. The signal field 1200 corresponds to the various HE-SIG-A fields described above with respect to FIGS. 2-10, in various embodiments. For example, the signal field 1200 corresponds to the HE-SIG-A 210 of FIG. 2, in an embodiment. As just another example, the signal field 1200 corresponds to the HE-SIG-A 310 of FIG. 3, in another embodiment. The signal field 1200 is included in a suitable data unit different from the data units described above with respect to FIGS. 2-10, in some embodiments. For ease of explanation, the signal field 1200 is described below with reference to the data unit 200 of FIG. 2.

The signal field 1200 includes a plurality of subfields 1202. Bit allocations for the subfields 1202, according to an example embodiment, are illustrated above the subfields 1202 in FIG. 12. Other bit allocations are used for the subfields 1202, in other embodiments. The subfields 1202 include a numerology subfield 1202-2, a bandwidth (BW) subfield 1202-4, a basic service set (BSS) color subfield 1202-6, a packet type subfield 1202-8, a reserved subfield 1202-10, an cyclic redundancy check (CRC) subfield 1202-12, and tail bits 1202-14. The numerology subfield 1202-2 includes an indication of a guard interval length used with OFDM symbols of the data portion 218 of the data unit 200, in an embodiment. For example, in an embodiment, the numerology subfield 1202-2 includes two bits set to indicate one of four possible guard interval lengths, in an embodiment. In another embodiment, the numerology subfield 1202-2 includes a suitable number of bits other than two bits. The BW subfield 1202-4 includes an indication of a bandwidth of the data unit 200, in an embodiment. The BSS color subfield 1202-6 includes an identifier of a BSS in which the data unit 200 is being transmitted, in an embodiment. The packet type subfield 1202-8 includes an indication of a type of the data unit 200. For example, in an embodiment, the packet type subfield 1202-8 is set to indicate whether the data unit 200 is an OFDM data unit or an OFDMA data unit, whether the data unit 200 is an SU data unit or an MU-MIMO data unit, etc., in an embodiment. The packet type subfield includes L_type number of bits, where L_type is an integer. In an embodiment, L_type is equal to two. Accordingly, in this embodiment, the packet type subfield 1202-8 includes two bits and is capable of indicating one of up to four different possible packet types. In another embodiment, the packet type subfield 1202-8 includes another suitable number bits (e.g., 1, 3, 4, 5, 6, etc.) of bits. The reserved subfield 1202-10 includes a suitable integer number (L_reserved) of reserved bits, in an embodiment.

With continued reference to FIG. 12, the CRC bits 1202-10 include CRC bits used to check correctness of the various subfields 1202 at a receiving device, in an embodiment. Tail bits 1206-14 include tail bits required to terminate the trellis of the convolution coder for proper operation. In some embodiments, the signal field 1200 omits some of the subfields 1202 illustrated in FIG. 12. For example, the signal field 1200 omits the BSS color subfield 1202-2, in an embodiment. As just another example, in an embodiment in which tail biting binary convolutional code (TBCC) encoding is used to encode the signal field 1200, the signal field 1200 omits the tail bits 1202-14. In some embodiments, the signal field 1200 includes additional subfields 1202 not illustrated in FIG. 12. For example, the signal field 1200 includes a resource allocation subfield that indicates resource units allocated for transmission of data to one or more client stations 25 in the data portion 218 of the data unit 200 (e.g., the widths and locations of the frequency portions 224 of the data portion 218), in some embodiments.

Figures 13A, 13B:
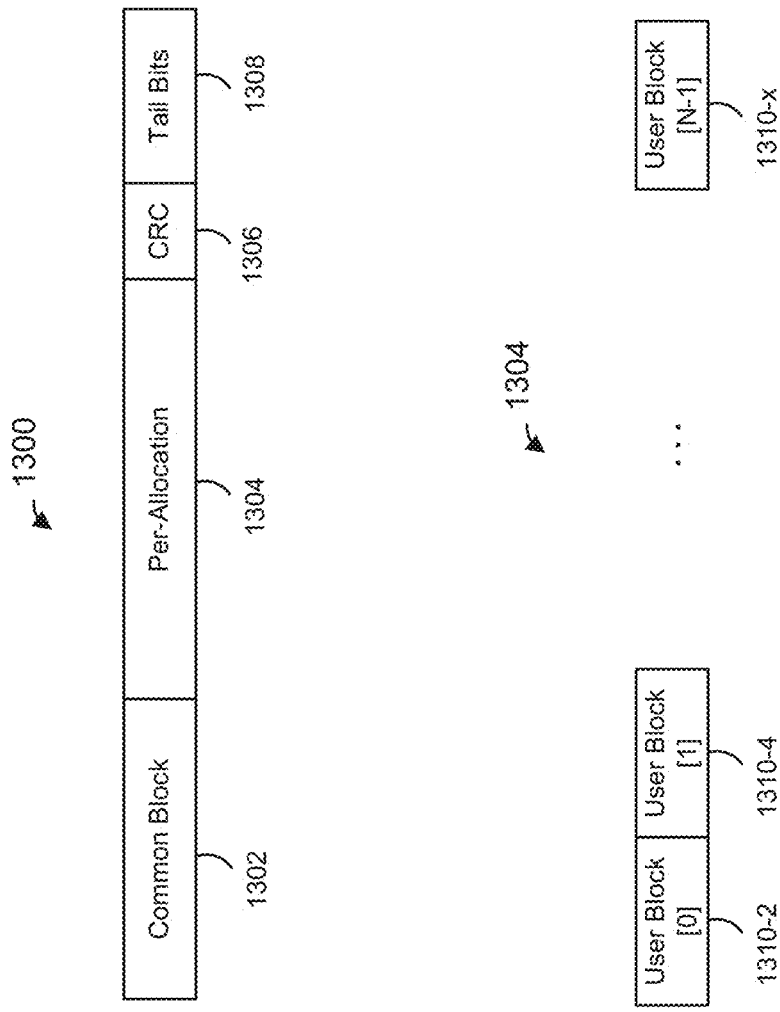
FIG. 13A is a bock diagram of a signal field, according to an embodiment.
FIG. 13B is a block diagram of a per-allocation portion of the signal field of FIG. 13A, according to an embodiment.

FIG. 13A is a bock diagram of a signal field 1300, according to an embodiment. The signal field 1300 corresponds to the various HE-SIG-B and/or HE-SIG-C fields described above with respect to FIGS. 2-10, in various embodiments. For example, the signal field 1100 corresponds to the HE-SIG-B 212 of FIG. 2, in an embodiment. As just another example, the signal field 1300 corresponds to the HE-SIG-B 312 of FIG. 3, in another embodiment. The signal field 1300 is included in a suitable data unit different from the data units described above with respect to FIGS. 2-10, in some embodiments. For ease of explanation, the signal field 1300 is described below with reference to the data unit 200 of FIG. 2.

The signal field 1300 includes a common portion (also referred herein as "common block") 1302 and a per-allocation portion 1304. Referring briefly to FIG. 13B, the per-allocation portion 1304 includes one or more user blocks 1310 respectively corresponding to one or more users (e.g., one or more client stations 25) that are scheduled to receive data in the data unit 200, as will be explained in more detail below, in an embodiment. Referring again to FIG. 13A, the signal field 1300 also includes a CRC subfield 1306 used to check the correctness of the common block 1302 and the per-allocation portion 1304 at a receiving device, in an embodiment. The signal field 1300 also includes tail bits 1308 that include tail bits required to terminate the trellis of the convolution coder for proper operation. In some embodiments, the signal field 1300 omits some of the subfields 1302-1308 illustrated in FIG. 11. For example, the signal field 1300 omits the CRC bits 1306 in some embodiments, such as in embodiments in which respective CRC bit are included in the common block 1302 and/or per-allocation portion 1302. In some embodiments, on the other hand, the CRC bits 1306 are included in the signal field 1300 even when respective CRC bit are additionally included in the common block 1302 and/or per-allocation portion 1302. As another example, the signal field 1300 omits the tail bits 108, for example when tail biting BCC encoding is used to encode the signal field 1300, in an embodiment. In some embodiments, the signal field 1300 includes one or more subfields not illustrated in FIG. 13A.

Figure 14:
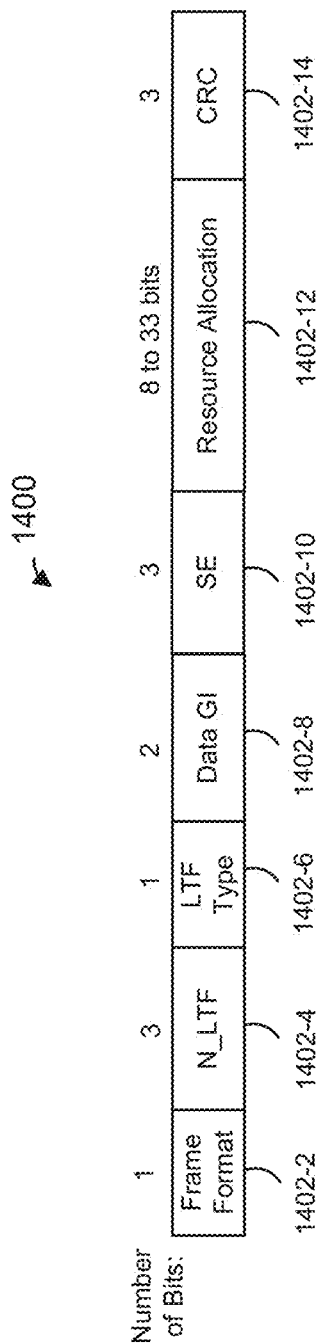
FIG. 14 is a block diagram of a common block included in a signal field, according to an embodiment.

FIG. 14 is a block diagram of a common block 1400 included in a signal field, according to an embodiment. In an embodiment, the common block 1400 corresponds to the common block 1302 of FIG. 13A. The common block 1400 is included in the HE-SIG-B 212 of FIG. 2, in an embodiment. For ease of explanation, the common block 1400 is described below with reference to the data unit 200 of FIG. 2. However, the common block 1400 is included in a signal field such as an HE-SIG-B field and/or HE-SIG-C field described above with respect to FIGS. 3-10, or is included in a suitable data unit different from the data units described above with respect to FIGS. 2-10, in some embodiments.

The common block 1400 includes a plurality of sub-fields 1402, in an embodiment. Bit allocations for the subfields 1402, according to an example embodiment, are illustrated above the subfields 1402 in FIG. 14. Other bit allocations are used for the subfields 1402, in other embodiments. The subfields 1102 include a frame format 1402-2, a number of LTF fields (N_LTF) subfield 1402-4, an LTF type subfield 1402-6, a data GI subfield 1402-8, a signal extension (SE) indication subfield 1402-10, a resource allocation subfield 1402-12, and CRC bits 1402-14.

The frame format subfield 1402-2 includes an indication of a format of the data unit 2000, such as whether the data unit 200 is an OFDM data unit or an OFDMA data unit, in an embodiment. The N_LTF subfield 1402-4 includes an indication of a number of OFDM symbols of the LTF fields 216 included in the data unit 200. The type of LTF subfield 1402-6 includes an indication of a type of LTF compression used with the LTF fields 216 included in the data unit 200. For example, the type of LTF subfield 1402-6 indicates whether 2× or 4× compression used with the with the LTF fields 216. The data GI subfield 1402-8 includes an indication of a guard interval used with OFDM symbols of the data portion 218 of the data unit 200. The signal extension subfield 1402-10 includes an indication of whether or not and extension field is appended to the data unit 200 and/or an indication of a length of the extension field, in embodiments. The resource allocation subfield 1402-12 indicates resource units allocated for transmission of data to one or more client stations 25 in the data portion 218 of the data unit 200 (e.g., the widths and locations of the frequency portions 224 of the data portion 218), in some embodiments. In an embodiment, the number of bits in the resource allocation subfield 1402-12 depends on the bandwidths of the data unit 200. For example, the resource allocation subfield 1402-12 includes 8 bits if the bandwidth of the data unit 200 is 20 MHz, 16 bits if the data unit 200 is 40 MHz, or 33 bits if the bandwidth of the data unit 200 is 80 MHz, wherein 32 bits are used to indicate resource unit allocation and an additional bit is used to indicate whether the center basic resource unit is unused, as will be explained in more detail below, in various embodiments.

In some embodiments, one or more of the format subfield 1402-2, the N_LTF subfield 1402-04, the type of LTF subfield 1402-6, the data GI subfield 1402-8, the signal extension subfield 1402-10, and resource allocation subfield 1402-12 are included in the HE-SIG-A 210 of the data unit 200. In such embodiments, the one or more of the format subfield 1402-2, the number of N_LTF subfield 1402-04, the type of LTF subfield 1402-6, the data GI subfield 1402-8, the signal extension subfield 1402-10, and resource allocation subfield 1402-12 that are included in the HE-SIG-A 210 of the data unit 200 are omitted from the common block 1400.

Figure 15:
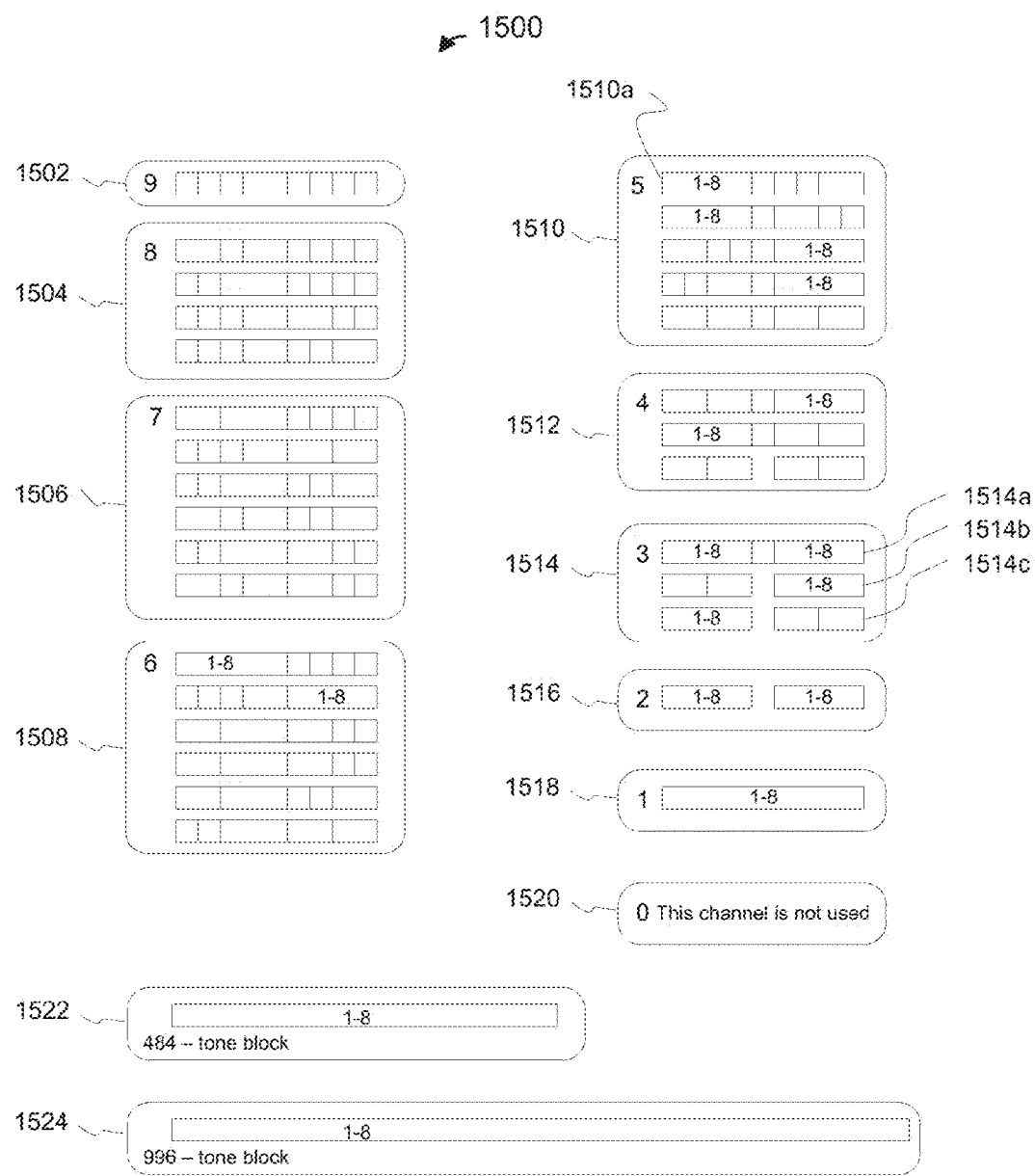
FIG. 15 is a diagram of allowed resources unit allocations for a communication channel, according to an embodiment.

FIG. 15 is a diagram of allowed resources unit allocations 1500 for a 20 MHz channel, according to an embodiment. In an embodiment, a resource allocation indication (e.g., a resource allocation indication included in the resource allocation subfield 1302-12) indicates a respective one of the resource allocations 1500 for each 20 MHz sub-band of the data unit that includes the resource allocation subfield (e.g., the data unit 200). According to the resource allocation 1500, a 20 MHz channel is sub-divided into nine 26-OFDM tone basic resource units, and an allocated resource unit in the 20 MHz channel includes one or more of consecutive basic resource units, in an embodiment. Only certain resource unit configurations are allowed, in an embodiment. The allowed resource unit configurations 1500, according to an embodiment, include a resource unit configuration 1502 in which the 20 MHz channel includes a total of 9 resource units, a resource unit configuration 1504 in which the 20 MHz channel includes a total of 8 resource units, a resource unit configuration 1506 in which the 20 MHz channel includes a total of 7 resource units, a resource unit configuration 1508 in which the 20 MHz channel includes a total of 6 resource units, a resource unit configuration 1510 in which the 20 MHz channel includes a total of 5 resource units, a resource unit configuration 1512 in which the 20 MHz channel includes a total of 4 resource units, a resource unit configuration 1514 in which the 20 MHz channel includes a total of 3 resource units, a resource unit configuration 1516 in which the 20 MHz channel includes a total of 2 resource units, and a resource unit configuration 1518 in which the 20 MHz channel includes a total of 1 resource unit. In an embodiment, the allowed resource unit configurations 1500 include some resource unit configurations in which a center basic resource unit (e.g., the center 26-OFDM tone block) is unused, such as, for example, a resource unit configuration 1514b, a resource unit configuration 1514c, and the resource unit configuration 1516.

In an embodiment, the allowed resource unit configurations 1500 also include a configuration 1522 in which the 20 MHz channel includes 0 resource units, i.e., the 20 MHz channel is unused. Additionally, the allowed resource unit configurations 1500 include a resource unit configuration 1522 in which a single resource unit included a 484 OFDM tone block that occupies a 40 MHz bandwidth that includes the 20 MHz channel and a neighboring 20 MHz channel, and a resource unit configuration 1524 in which a single resource unit includes a 996 OFDM tone block and occupies an 80 MHz bandwidth that includes the 20 MHz channel and three other consecutive neighboring 20 MHz channels, in an embodiment.

In an embodiment, a resource allocation indication that indicates one of the allowed resource allocations 1500 includes eight bits. A particular value of the eight bits corresponds to a particular resource allocation configuration 1502-1524 illustrated in FIG. 15. In an embodiment, the allowed resource unit configurations 1500 include some resource units that can be allocated for MU-MIMO transmission to multiple client stations 25. In an embodiment, only resource units that include a predetermined minimum number OFDM tones, or a predetermined minimum number of basic resource units, are eligible for allocation for MU-MIMO transmission. For example, in an embodiment, only resource units that include a number of OFDM tones that is equal to or greater than 106 OFDM tones (i.e., at least four basic resource units) can be allocated for MU-MIMO transmission. In an embodiment, a particular eight-bit value in the resource allocation configuration 1500 that corresponds to a resource unit configuration that includes a 106-OFDM tone resource unit also indicates a number of users (e.g., 1-8 users) allocated in the 106-OFDM resource unit. Thus, for example, a total of eight eight-bit values correspond to a resource unit configuration 1510*a* that included a 106-OFDM tone resource unit, with each of the eight values corresponding to a particular number of client stations allocated in the 106-OFDM tone resource unit. Similarly, as another example, a total of sixty four eight-bit values correspond to a resource unit configuration 1510*a* that included two 106-OFDM tone resource units, with each of the sixty four values corresponding to a particular number of client stations allocated in each of two 106-OFDM tone resource units, in an embodiment.

In an embodiment, a receiving device determines, based on the resource allocation indication, the number of resource units in the corresponding sub-band of the data unit 200. The receiving device additionally determines which ones of the resource units, if any, are multi-user resource units, and the specific number of users scheduled in each multi-user resource unit, in an embodiment. Such information allows the receiving device to determine the number user blocks included in the signal field that includes the resource allocation indication, and the therefore deterministically decode the user blocks, in an embodiment.

FIGS. 16A and 16B are block diagrams of user blocks 1600, 1650 that correspond to an MU-MIMO resource unit and an SU resource unit, respectively, according to an embodiment. In an embodiment, each of the user blocks 1310 of FIG. 13B corresponds to one of the user blocks 1600, 1650. In an embodiment, the user blocks 1600, 1650 are of a fixed length with a same number of bits. Thus, for example, a user block 1310 of FIG. 13B includes a same number of bits regardless of whether the user 1310 corresponds to a single user resource unit or a multi-user resource unit, in an embodiment.

Referring first to FIG. 16A, the MU-MIMO user block 1600 includes a plurality of subfields 1602. The number of bits allocated to each subfield 1602, according to an example embodiment, is indicated in FIG. 16A above the corresponding subfield 1602. Other suitable numbers of bits are allocated to the subfields 1602, in other embodiments. The subfields 1602 include an station identifier (STA-ID) subfield 1602-2, a start stream index 1604-4, a number of space time streams corresponding to the user ($N_{sts}[u]$) subfield 1602-6, a modulation and coding scheme (MCS) subfield 1602-8, a coding subfield 1602-10 and CRC bits 1602-12. In an embodiment, the STA-ID subfield 1602 includes an identifier of a client station 25, such as an association identifier (AID) or a partial AID of the client station 25. The start stream index 1602 includes an indication of a first spatial stream, e.g., of eight possible spatial streams or of four possible spatial streams, allocated to the client station 2 indicated by the STA-ID subfield 1602. The $N_{sts}[u]$ subfield 1602-6 indicates a number of spatial streams allocated to the client station 25 indicated by the STA-ID subfield 1602, in an embodiment. The MCS subfield 1602-8 indicate a modulation and coding scheme used for transmission of data to the client station 25 indicated by the STA-ID subfield 1602, and the coding subfield 1602-10 indicates a coding type, such as whether BCC coding or LDPC coding is used to encode data for the client station 25, in an embodiment. CRC bits 1602-12 include CRC bits to check correctness of the various subfields 1602, in an embodiment.

Referring now to FIG. 16B, the SU user block 1650 is generally the same as the MU-MIMO user block 1600 of FIG. 16A except that bits used for the start stream index subfield 1602-4 and bits used for the $N_{sts}[u]$ subfield 1602-6 in the MU-MIMO user block 1600 are used for $N_{sts}$ subfield 1652-4, a transmit beamforming (TxBF) subfield 1652-6 and space time block coding (STBC) subfield 1652-8 in the SU user block 1650. The $N_{sts}$ subfield 1652-4 includes an indication of a number of spatial or space time streams allocated to the station 25 indicated by the STA-ID subfield 1602-2 for SU transmission to the client station, in an embodiment. The TxBF subfield 1652-6 and the STBC subfield 1652-8 indicate whether transmit beamforming is used for transmission to the client station and whether space time block coding is used for transmission to the client station, respectively, in an embodiment.

FIGS. 16C and 16D are block diagrams of user blocks 1670, 1690 that correspond to an MU-MIMO resource unit and an SU resource unit, respectively, in another embodiment. In an embodiment, each of the user blocks 1310 of FIG. 13B corresponds to one of the user blocks 1670, 1690. In an embodiment, the user blocks 1670, 1690 are of a fixed length with a same number of bits. Thus, for example, a user block 1310 of FIG. 13B includes a same number of bits regardless of whether the user 1310 corresponds to a single user resource unit or a multi-user resource unit, in an embodiment.

Referring first to FIG. 16C, the MU-MIMO user block 1670 is generally similar to the MU-MIMO user block 1600 of FIG. 16A except that spatial stream allocation is indicated in the MU-MIMO user block 1670 differently from spatial stream allocation indication used in the MU-MIMO user block 1600. In an embodiment, instead of indicating a start stream index and a number of spatial streams to indicate spatial stream allocation corresponding to the client station 25 indicated by the STA-ID subfield 1602-2, as is the case in the MU-MIMO user block 1600, the MU-MIMO user block 1670 utilizes an single spatial stream indication is used to indicate spatial stream configuration for all client stations 25 included in the MU-MIMO transmission of which the client station 25 indicated by the STA-ID subfield 1602-2 is a part. Accordingly, the start stream index 1604-4 and the $N_{sts}[u]$ subfield 1602-6 in the MU-MIMO user block 1600 are replaced with a single $N_{sts}$ subfield 1670-4 in the MU-MIMO user block 1670, in an embodiment.

In an embodiment, the client stations 25 included in the MU-MIMO transmission are ordered in non-increasing order of numbers of spatial streams allocated to the client stations 25. Accordingly, the client stations are ordered such that $N_{sts}[1] \geq N_{sts}[2] \geq \ldots \geq N_{sts}[N_{user}]$, where $N_{user}$ is the number of client stations 25 included in the MU-MIMO transmission. The user blocks corresponding to the client stations 25 are transmitted in the corresponding order, in an embodiment. In this case, in an embodiment in which a maximum number of client stations 25 included in the MU-MIMO transmission ("users") is four and a maximum of four spatial streams is four, a maximum number of possible combinations of numbers of spatial streams allocated to the client stations 25 is 12. Accordingly, given a particular number of client stations 25 included in the MU-MIMO transmission ($N_{user}$), four bits are sufficient in the $N_{sts}$ subfield 1670-4 to indicate a particular spatial streams allocation corresponding to the client stations 25, in this embodiment. Similarly, in an embodiment in which a maximum number of users is four and a maximum of four spatial streams is eight, a maximum number of possible combinations of numbers of spatial streams allocated to the client stations 25 is 16. Accordingly, given a particular number of client stations 25 included in the MU-MIMO transmission ($N_{user}$), four bits are sufficient in the $N_{sts}$ subfield 1670-4 to indicate a particular spatial streams allocation corresponding to the client stations 25, in this embodiment.

Figure 17B:
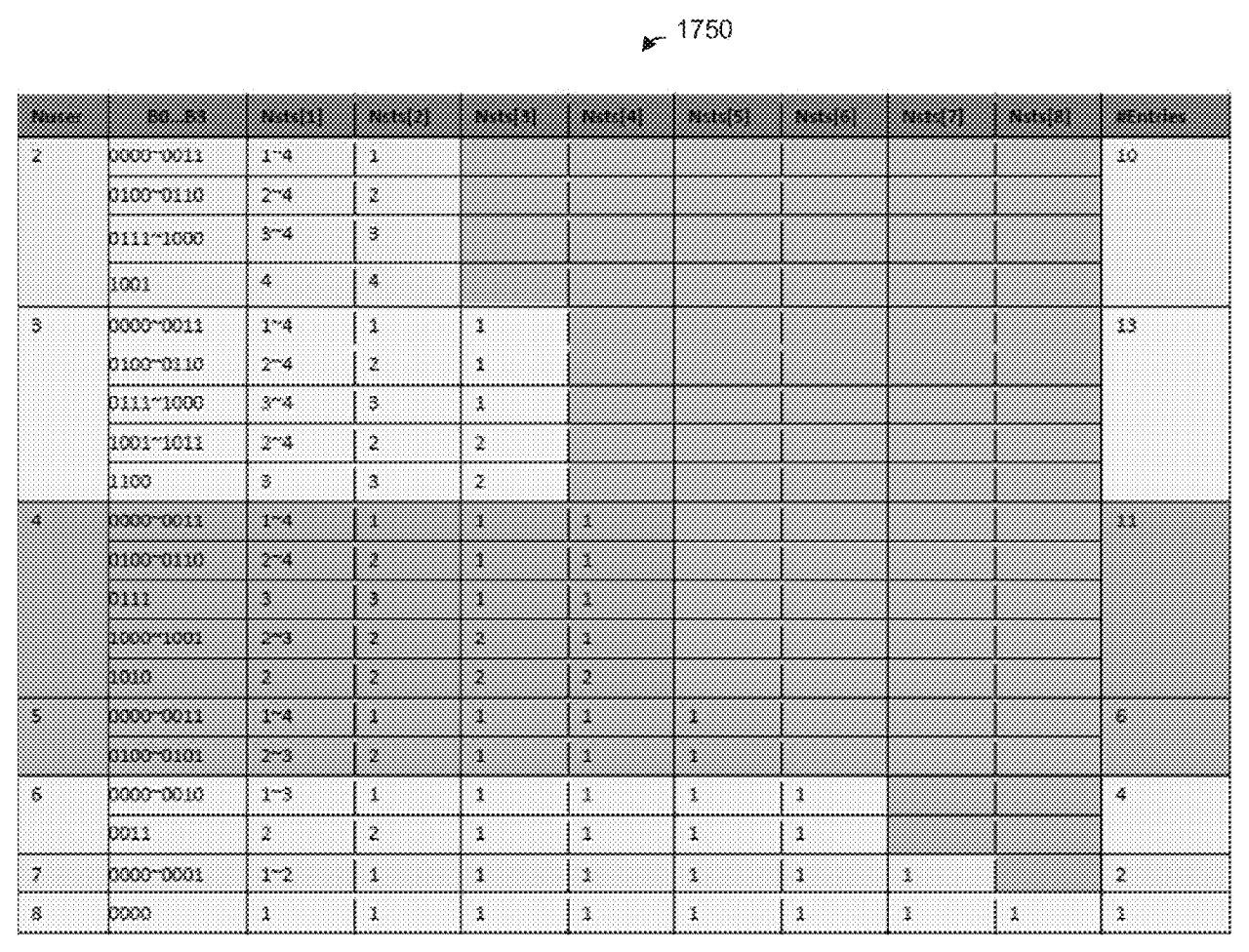

FIG. 17A illustrates possible spatial stream allocation combinations 1700 according to an embodiment in which a maximum users is four and a maximum of four spatial streams is four. The possible spatial stream allocation combinations 1700 are organized in a plurality of tables 1702, each table 1702 corresponding to a number of users included in an MU-MIMO transmission. Referring to FIG. 15A, in an embodiment, the $N_{sts}$ subfield 1570-4 indicates a spatial stream allocation combinations illustrated in FIG. 17A in a table 1702 corresponding to the number of client stations 25 included in the MU-MIMO transmission of which the client station 25 indicated by the STA-ID subfield 1502-2 is a part, in an embodiment. FIG. 17B illustrates a table 1750 that lists correspondence between values of the four bits of the $N_{sts}$ subfield 1770-4 and the spatial stream allocation combinations illustrated in FIG. 17A, according to an embodiment. In an embodiment, $N_{sts}$ subfield 1670-4 of FIG. 16C includes four bits set according to the table 1750 of FIG. 17B.

FIG. 17C illustrates possible spatial stream allocation combinations 1770 according to an embodiment in which a maximum users is four and a maximum of four spatial streams is eight. The possible spatial stream allocation combinations 1770 are organized in a plurality of tables 1772, each table 1772 corresponding to a number of users included in an MU-MIMO transmission. Referring to FIG. 16A, in an embodiment, the $N_{sts}$ subfield 1670-4 indicates a spatial stream allocation combination illustrated in FIG. 17C in a particular table 1772 that corresponds to the number of client stations 25 included in the MU-MIMO transmission of which the client station 25 indicated by the STA-ID subfield 1602-2 is a part, in an embodiment.

Referring now to FIG. 16D, the SU-MIMO user block 1690 is generally similar to the SU-MIMO user block 1650 of FIG. 16B except the SU-MIMO user block 1690 omits the STBC subfield 1652-8. Referring briefly to FIG. 13, in an embodiment, space time block coding indication is included in the common block 1302. The space time block coding indication included in the common block 1302 applies to all client stations 25 to which data is transmitted in the data unit 200, in an embodiment. Referring again to FIGS. 16C-16D, in another embodiment, the MU-MIMO user block 1670 and the SU-MIMO user block 1690 each includes an STBC subfield such as the STBC subfield 1652-8. Accordingly, equal length of the MU-MIMO user block 1670 and the SU-MIMO user block 1690 is maintained, in this embodiment.

Figure 18A:
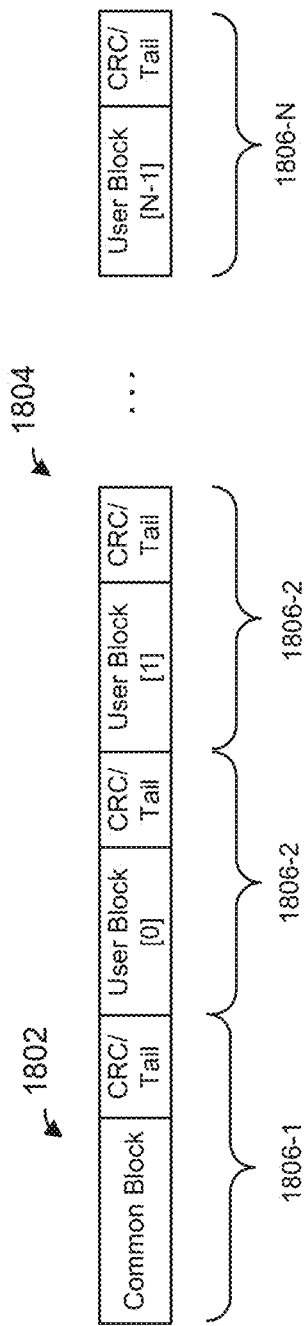
FIGS. 18A-18C are diagrams that illustrate different encoding schemes for portions of a signal field, according to several embodiments.
Figure 18B:
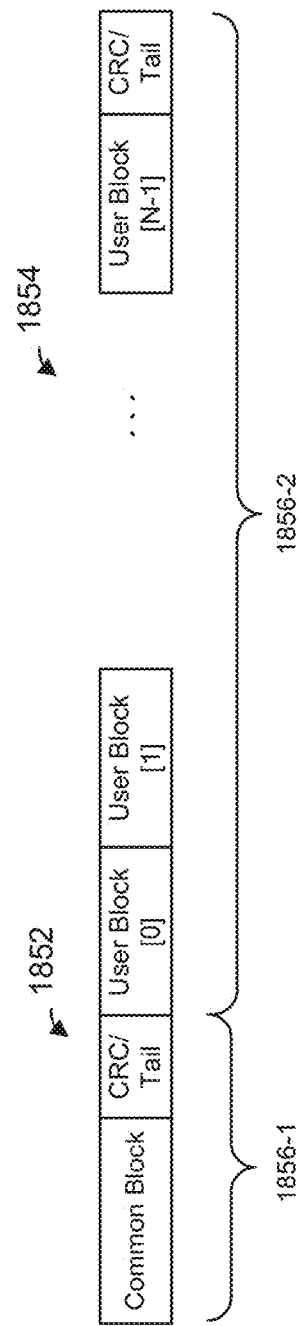
Figure 18C:
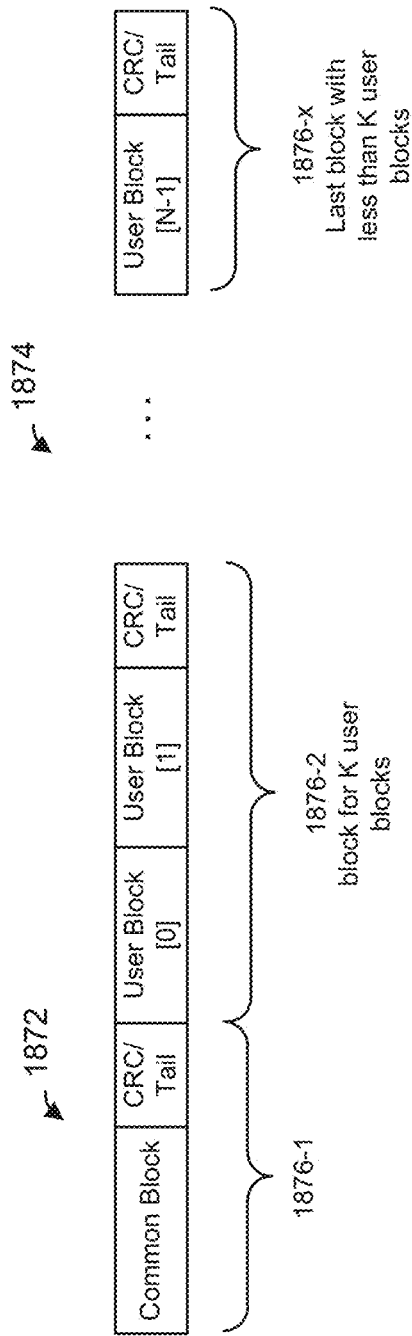

Referring back to FIGS. 13A-13B, the common block 1302 and the user blocks 1310 are encoded jointly, individually, or in groups, in various embodiments. FIGS. 18A-18C are diagrams that illustrate different encoding schemes for encoding the common block 1302 and the user blocks 1310-2, according to several embodiments. Referring first to FIG. 18A, a common block 1802 corresponds to the common block 1302 of FIG. 13A and user blocks 1804 correspond to user blocks 1310 of FIG. 13B, in an embodiment. The common block 1802 and each of the user blocks 1804 is each encoded as a separate block 1806, in the illustrated embodiment. The common block 1802 and the user blocks 1804 are encoded using BCC encoding, in an embodiment. As illustrated in FIG. 18A, the encoded blocks 1806 include respective CRC bits and respective tail bits, in an embodiment. In another embodiment, common block 1802 and the user blocks 1804 are encoded using TBCC encoding. In this embodiment, the encoded blocks 1806 omit tail bits.

Referring now to FIG. 18B, a common block 1852 corresponds to the common block 1302 of FIG. 13A and user blocks 1854 correspond to user blocks 1310 of FIG. 13B, in an embodiment. In the embodiment of FIG. 18B, the common block 1852 is encoded as a first block 1856-1, and the user blocks 1854 are collectively encoded as a second block 1856-2. The common block 1852 and the user blocks 1854 are encoded using BCC encoding, in an embodiment. As illustrated in FIG. 18B, the encoded blocks 1866 include respective CRC bits and respective tail bits, in an embodiment. In another embodiment, common block 1852 and the user blocks 1854 are encoded using TBCC encoding. In this embodiment, the encoded blocks 1856 omit tail bits.

Referring now to FIG. 18C, a common block 1872 corresponds to the common block 1302 of FIG. 13A and user blocks 1874 correspond to user blocks 1310 of FIG. 13B, in an embodiment. In the embodiment of FIG. 18C, the common block 1872 is encoded as a first BCC block 1876-1, and the user blocks 1874 are encoded in groups of K user blocks 1874, where each group of K user blocks 1874 is encoded as a separate BCC block 1876, wherein K is a positive integer. In an embodiment, K is a predetermined integer greater than zero. In another embodiment, K is configurable. For example, the AP selects or determines any suitable number K of user blocks to be encoded as a single BCC block and signals the determined or selected number K, explicitly or implicitly, to client stations 25, in an embodiment. In an embodiment, if the number N of user blocks 1874 in a signal field is not divisible by K, then the last L user blocks 1874 are encoded as a separate block 1876, wherein L is a positive integer and wherein L<K. In the embodiment of FIG. 18C, K is equal to 2 and L is equal to 1. Each group of two user blocks 1874, except for the last one user blocks 1874, is encoded as a separate BCC block 1876, and the last user block 1874 is individually encoded as a separate BCC block 1876, in the illustrated embodiment. In other embodiments and/or scenarios, K is a suitable integer other than 2 (e.g., 3, 4, 5, 6, etc.), and, depending on the number of user blocks 1874 in the signal field, L is an integer other than 1 (e.g., 0, 2, 3, 4, 5, 6 etc.).

In some embodiments, the user blocks 1874 are encoded in groups that do not necessarily include an equal number of user blocks 1874. As an example, a plurality user blocks 1874 corresponding to client stations included in an MU-MIMO transmission over a bandwidth that is greater than 20 MHz (e.g., using a 484-OFDM tone resource unit), these user blocks 1874 from a group that is encoded as a single block, in an embodiment. As another example, in an embodiment, a first number of user blocks 1874 corresponding to particular one or more 20 MHz channels from a first group that is encoded as a first single block, and a second number of user blocks 1874 corresponding to one or more other 20 MHz channels from a second group that is encoded as a second single block, wherein the first number of user blocks 1874 is not necessarily the same as the second number of user blocks 1874.

The common block 1872 and the user blocks 1874 are encoded using BCC encoding, in an embodiment. As illustrated in FIG. 18C, the encoded blocks 1876 include respective CRC bits and respective tail bits, in an embodiment. In another embodiment, common block 1872 and the user blocks 1874 are encoded using TBCC encoding. In this embodiment, the encoded blocks 1876 omit tail bits.

Figure 19:
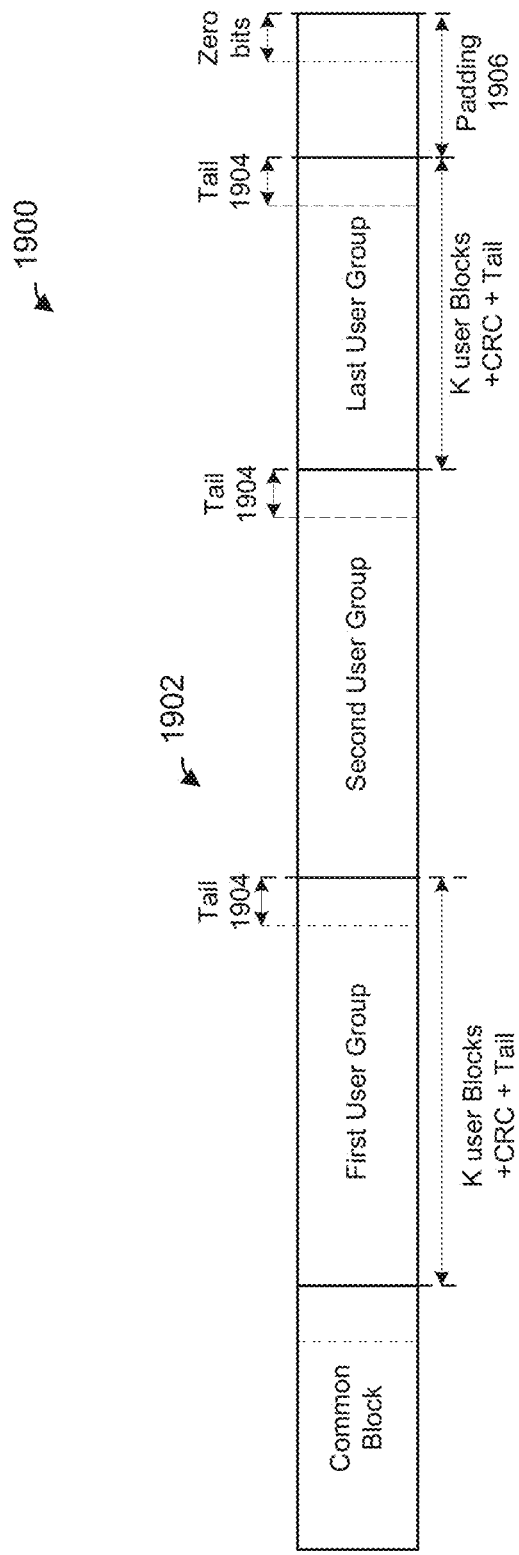
FIG. 19 is a block diagram of a signal field that includes one or more padding bits, according an embodiment.

Referring back to FIGS. 13A-13B, one or more padding bits are included in the a signal field 1300 to ensure that encoded information bits in the signal field 1300 completely fill an integer number of OFDM symbols, in some embodiments and/or scenarios. In an embodiment, one or more padding bits are added (e.g., appended), to a set of information bits to be included in the signal field 1300, prior to encoding the information bits. In another embodiment, one or more padding bits are added (e.g., appended), to a set information bits to be included in the signal field 1300, after encoding the information bits. FIG. 19 is a block diagram of a signal field 1900 that includes one or more padding bits added to information bits prior to encoding, according to an embodiment. In an embodiment, the signal field 1900 corresponds to the signal field 1300 of FIG. 13. In the embodiment of FIG. 19, user blocks included in the signal field 1900 are encoded in groups 1902 of user blocks as described with respect to FIG. 18C. Prior to encoding, tail bits 1904 (e.g., 6 zero tail bits) are inserted after a respective set of information bits corresponding to each group of user blocks 1902, in an embodiment. Also prior to encoding, a number of padding bits inserted after information bits and tail bits corresponding to the last user block 1902. The number of padding bits to be inserted is determined such that the padding bits 1906, after being encoded, fill an OFDM symbol up to OFDM symbol boundary, in an embodiment. In an embodiment, the padding bits 1906 include pseudo-random padding bits. In another embodiment, the padding bits 1906 include repetitions of one or more information bits in the signal field 1900. In some embodiments, the last six padding bits 1906, or all of the padding bits 1906 if the number of padding bits 1906 is less than or equal to six, are set to zero.

In an embodiment, the number of padding buts added to a particular signal field i is determined according to:

$$N^{(i)}_{pre-FEC,pad} =$$
$$N_{sym,SIG} \cdot N^{(i)}_{DBPS,SIG} - N^{(i)}_{STA} \cdot L_{user} - L^{(i)}_{common} - 6N^{(i)}_{group} - N^{(i)}_{CRC}$$ Equation 1 where $$N^{(i)}_{group} = \left\lceil \frac{N^{(i)}_{STA}}{K} \right\rceil + 1$$ Equation 2 and where
$N_{STA}^{(i)}$ is the number of client stations for which user blocks are included in the signal field (i),
$L_{user}$ is the number of bits in each of the user blocks (excluding CRC bits),
$L_{common}^{(i)}$ is the number of bits in the common block included in the signal field (i) (excluding CRC bits), and
$N_{CRC}^{(i)}$ is the total number of CRC bits included in the signal field (i).

In an embodiment, a receiving device that receives the signal field 1900 first decodes the common block 1902 and determines the number client stations for which user blocks are included in the signal field 1900 based on resource unit allocation indication included in the common block 1902. The receiving device the determines the number of padding bits 1906 in the signal field 1900 according to Equations 1 and 2, where $N_{STA}^{(i)}$ is the number of client stations determined based on the resource unit allocation indication included in the common block 1902.

In an embodiment in which padding bits are added, to a stream information bits to be included in the signal field, after encoding the information bits, the number of padding bits is determined, both at the transmitting device and a receiving device, by using Equations 1 and 2 above, and further by using $$N_{post-FEC,pad}^{(i)} = N_{post-FEC,pad}^{(i)}/R$$ Equation 3 where R is the coding rate used to encode the information bits.

Figure 20:
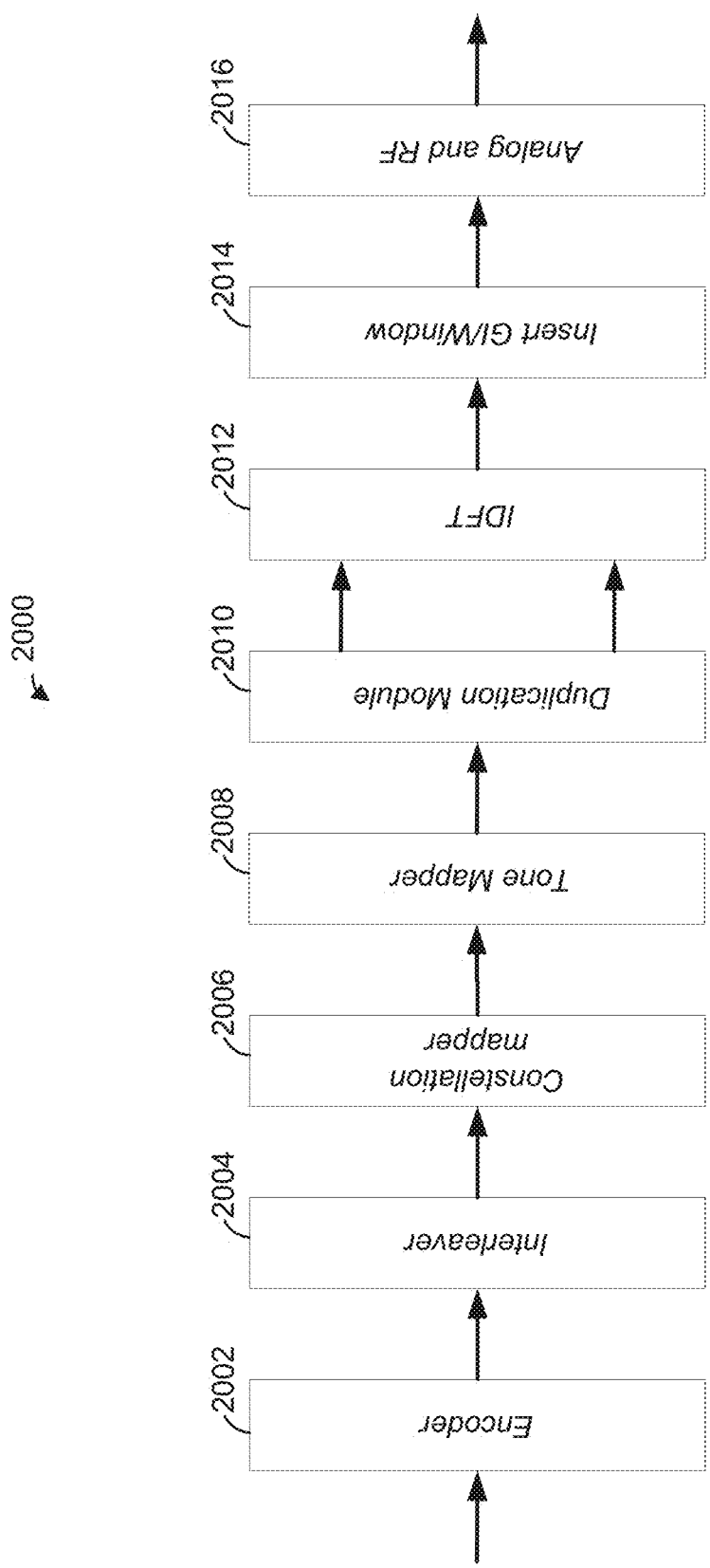
FIGS. 20-28 are block diagrams of transmit portions of example PHY processing units configured to generate a signal field, according to various embodiments.

FIG. 20 is a block diagram of a transmit portion of an example PHY processing unit 2000 configured to generate a signal field such as one of the HE-SIG-B fields described herein, according to an embodiment. Referring to FIG. 1, the PHY processing unit 20 of AP 14 and the PHY processing unit 29 of client station 25-1 each include and/or are configured to perform the processing of the PHY processing unit 2000, in one embodiment. The PHY processing unit 2000 generates information bits (e.g., PHY-related bits) to be included in the HE-SIG-B field (e.g., signal field bits). In some embodiments, the PHY processing unit 2000 is configured to add tail bits to the signal field bits. An encoder 2002 encodes the information bits. In an embodiment, the encoder 2002 is a BCC encoder. In another embodiment, the encoder 2002 is another suitable type of encoder (e.g., LDPC) encoder. In an embodiment in which the encoder 2002 is a BCC encoder, the encoder 2002 utilizes a coding rate of 1/2. In other embodiments, other suitable coding rates are utilized.

An output of the BCC encoder 2002 is coupled to an interleaver 2004. The interleaver 2004 interleaves bits (i.e., changes the order of the bits) to prevent long sequences of adjacent noisy bits from entering a decoder at the receiver. More specifically, the interleaver 2004 maps adjacent bits (encoded by the encoder 2002) onto non-adjacent locations in the frequency domain or in the time domain. In an embodiment in which the HE-SIG-B field is to be duplicated such that multiple copies of the HE-SIG-B field are included in the data unit, the interleaver 2004 operates on a bandwidth corresponding to one copy of the signal field. As an example, in an embodiment in which signal field content corresponding to 40 MHz is duplicated to be included in an 80 MHz-wide data unit, the interleaver 2004 operates within the 40 MHz bandwidth. In some embodiments, the interleaver 2004 is omitted.

An output of the interleaver 2004 (or of the encoder 2002 if the BCC interleaver 2004 is omitted) is coupled to a constellation mapper 2006. In an embodiment, the constellation mapper 2006 maps bits to constellation points corresponding to different subcarriers/tones of an OFDM symbol. In an embodiment, the constellation mapper 2006 generates modulation data corresponding to frequency domain representations of modulated bits. For example, in an embodiment, the constellation mapper 2006 maps bits to binary phase shift keying (BPSK) constellation points. In other embodiments, the constellation mapper 2006 maps bits to constellation points corresponding to other suitable modulation schemes such phase shift keying (PSK), quadrature amplitude modulation (QAM), e.g., 4-QAM, 16-QAM, 64-QAM, 128-QAM, 256-QAM, etc.

An output of the constellation mapper 2006 is provided to a tone mapper 2008. In an embodiment, the tone mapper 2008 maps the constellation points to OFDM tones of the HE-SIG-B field. In an embodiment, the tone mapper 2008 utilizes direct tone mapping. In this embodiment, the tone mapper 2008 maps consecutive constellation points to consecutive "useful" or "data" OFDM tones of the HE-SIG-B field. In other embodiment, the tone mapper 2008 "reorders" OFDM tones of the HE-SIG-B field by mapping consecutive constellation points onto non-consecutive useful OFDM tones of the HE-SIG-B field. In an embodiment in which the HE-SIG-B field is to be duplicated such that multiple copies of the HE-SIG-B field are included in the data unit, the tone mapper 2008 operates on a bandwidth corresponding to one copy of the signal field. As an example, in an embodiment in which signal field content corresponding to 40 MHz is duplicated to be included in an 80 MHz-wide data unit, the tone mapper 2008 operates within the 40 MHz bandwidth. In some embodiments, the tone mapper 2008 is omitted.

In embodiments in which the HE-SIG-B field is to be duplicated, output of the tone mapper 2008 (or of the constellation mapper 2006 if the tone mapper 2008 is omitted) is provided to a duplication module 2010. The duplication module 2010 duplicates signal field content such that the signal field content occupies the entire bandwidth of the data unit. As an example, the duplication module duplicates HE-SIG-B signal field content that spans a 40 MHz bandwidths such that the HE-SIG-B field spans an 80 MHz of the data unit, in an embodiment. In an embodiment in which HE-SIG-B field is not duplicated (e.g., in which HE-SIG-B content spans the entire bandwidth of the data unit), the duplication module 2010 is omitted.

Outputs of the duplication module 2010 (or the output of the tone mapper 2008 if the duplication module 2010 is omitted or output of the constellation mapper 2006 if both the tone mapper 2008 and the duplication module 2010 are omitted) are provided to an inverse discrete-time Fourier transform (IDFT) calculation unit 2012 (e.g., an inverse fast Fourier transform (IFFT) calculation unit). The IFFT unit 2012 converts a block of constellation points to a time-domain signal. The block of constellation points operated upon the IDFT calculation unit 2012 corresponds to all of the entire bandwidth of the data unit, in an embodiment.

Output of the IFFT unit 2012 is provided to GI insertion and windowing units 2014 that prepend to OFDM symbols, a guard interval (GI) portion, which is a circular extension of an OFDM symbol in an embodiment, and smooth the edges of OFDM symbols to increase spectral delay. Output of the GI insertion and windowing units 2014 is provided to analog and radio frequency (RF) units 2016 that converts the signal to an analog signal and upconverts the signal to RF frequencies for transmission. The signal is transmitted and spans the entire bandwidth of the data unit.

Figure 21:
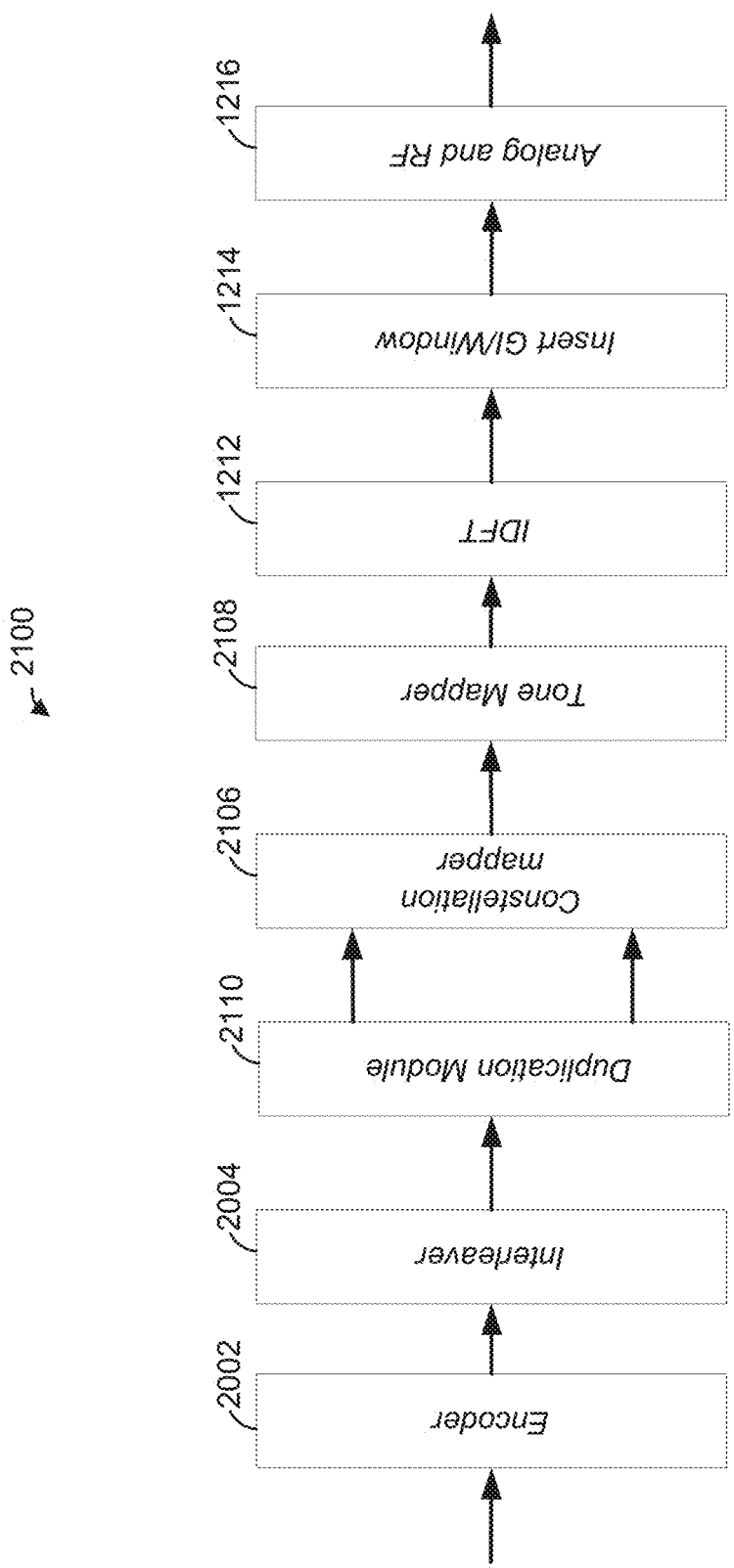

FIG. 21 is a block diagram of a transmit portion of an example PHY processing unit 2100 configured to generate a signal field such as one of the HE-SIG-B fields described herein, according to an embodiment. Referring to FIG. 1, the PHY processing unit 20 of AP 14 and the PHY processing unit 29 of client station 25-1 each include and/or are configured to perform the processing of the PHY processing unit 2100, in one embodiment. The PHY processing unit 2100 is generally similar to the PHY processing unit 2000 of FIG. 20, except that in the PHY processing unit 2100 HE-SIG-B content duplication is performed on bit level instead of constellation point level. Accordingly, the PHY processing unit 2100 includes a duplication module 2110 before a constellation mapper 2106, and omits the duplication module 2110, in an embodiment. Further, because HE-SIG-B content duplication is performed before constellation mapping and, if used, tone mapping, the constellation mapper 2106 and, if used, the tone mapper 2108, each operates on the entire bandwidth of the data unit, in an embodiment.

Figure 22:
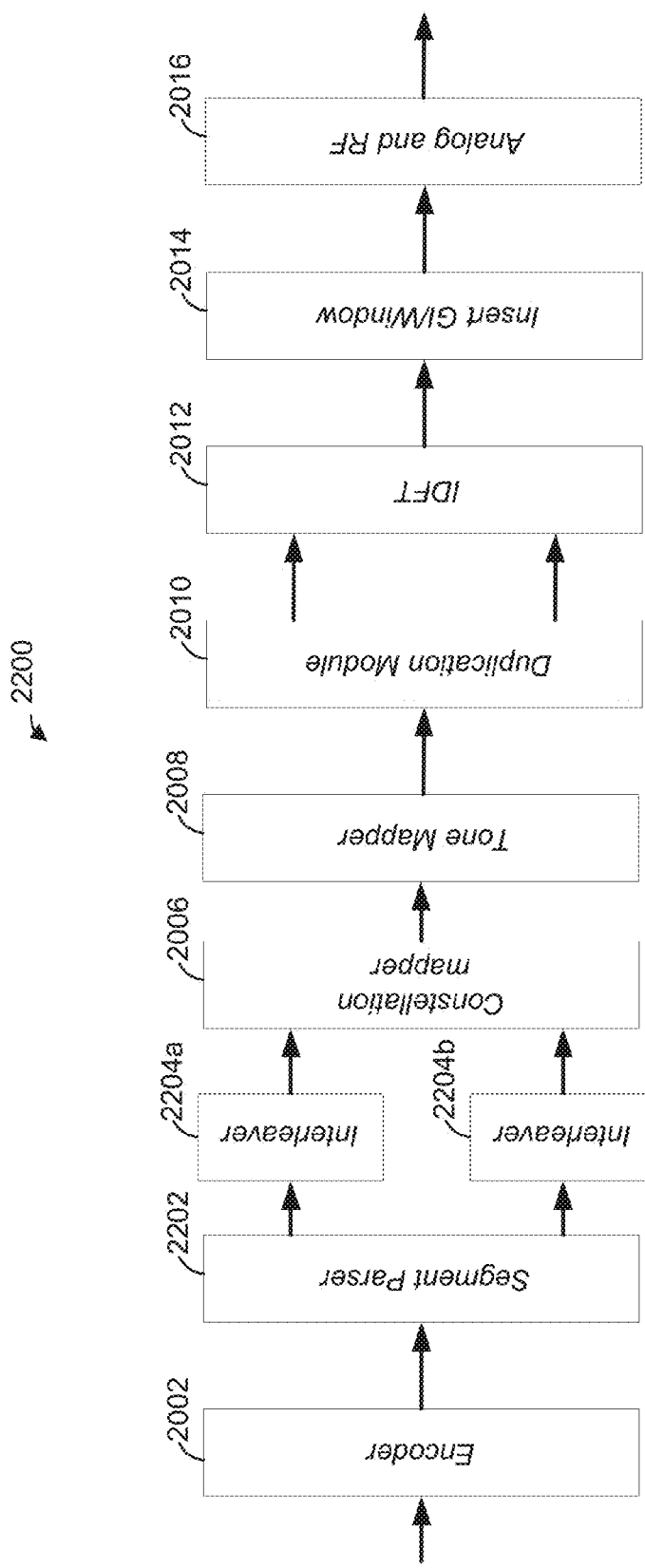

FIG. 22 is a block diagram of a transmit portion of an example PHY processing unit 2200 configured to generate a signal field such as one of the HE-SIG-B fields described herein, according to an embodiment. Referring to FIG. 1, the PHY processing unit 20 of AP 14 and the PHY processing unit 29 of client station 25-1 each include and/or are configured to perform the processing of the PHY processing unit 2200, in one embodiment. The PHY processing unit 2200 is generally similar to the PHY processing unit 2000 of FIG. 20, except that in the PHY processing unit 2200, the interleaver 2004 is replaced by two a segment parser 2202 and multiple interleavers 2204. Each of the multiple interleavers 2204 operates on a respective sub-band of the bandwidth spun by the HE-SIG-B content. Thus, for example, in an embodiment in which HE-SIG-B content spans 40 MHz, the PHY processing unit 2200 includes two interleavers 2204 each operating on a respective 20 MHz sub-band of the 40 MHz bandwidth.

Figure 23:
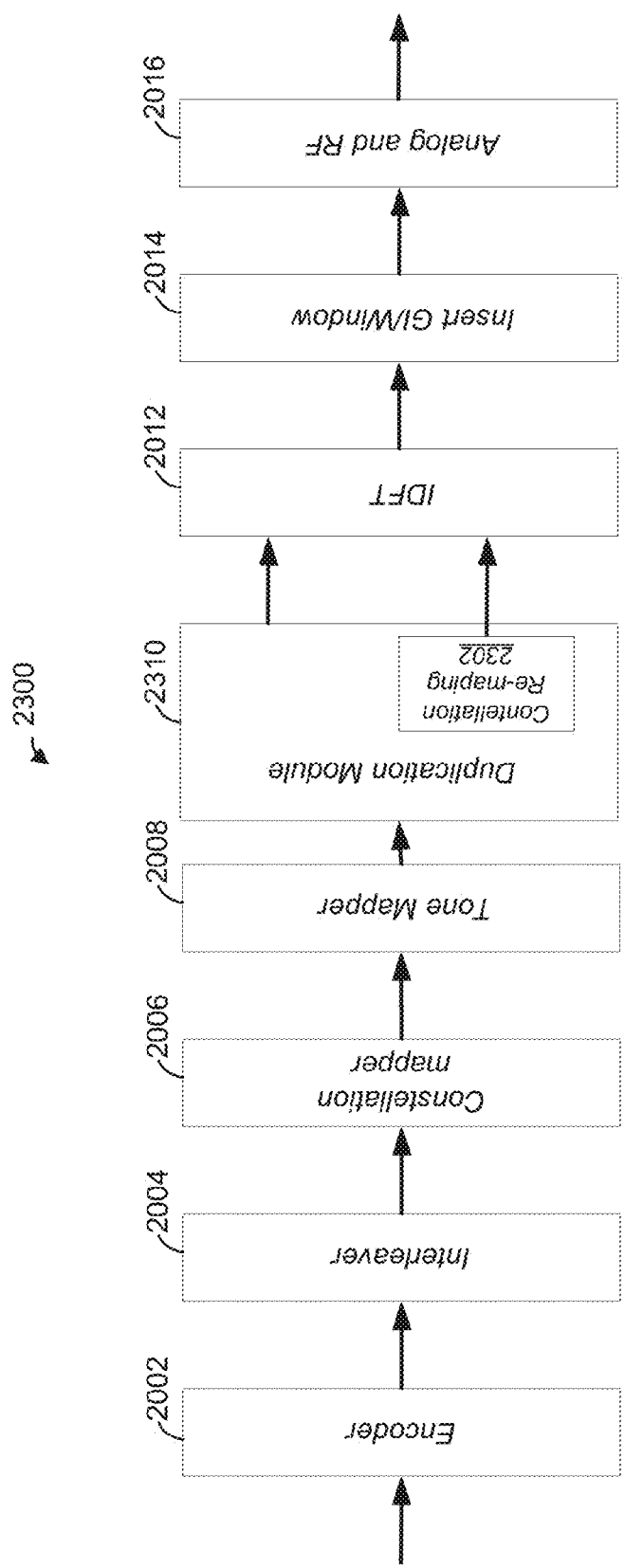

FIG. 23 is a block diagram of a transmit portion of an example PHY processing unit 2300 configured to generate a signal field such as one of the HE-SIG-B fields described herein, according to an embodiment. Referring to FIG. 1, the PHY processing unit 20 of AP 14 and the PHY processing unit 29 of client station 25-1 each include and/or are configured to perform the processing of the PHY processing unit 2300, in one embodiment. The PHY processing unit 2300 is generally similar to the PHY processing unit 2000 of FIG. 20, except that in the PHY processing unit 2300 constellation point duplication is combined with constellation point re-mapping for one or more of the copies of the HE-SIG-B field. To this end, in an embodiment, the duplication module 2010 of the PHY processing unit 2000 of FIG. 20 is replaced in the PHY processing unit 2300 with a duplication module 2310. The duplication module 2310 is generally the same as the duplication module 2010 of FIG. 20 except that the duplication module 2310 includes a constellation re-mapping module 2312 which re-maps castellation points corresponding to a copy generated by the duplication module 2310 to other suitable constellation points to increase diversity in the HE-SIG-B field. In an embodiment, the constellation re-mapping module 2312 changes the sign of each constellation point corresponding to a copy generated by the duplication module 2310. In other embodiment, other suitable re-mapping techniques are utilized.

Figure 24:
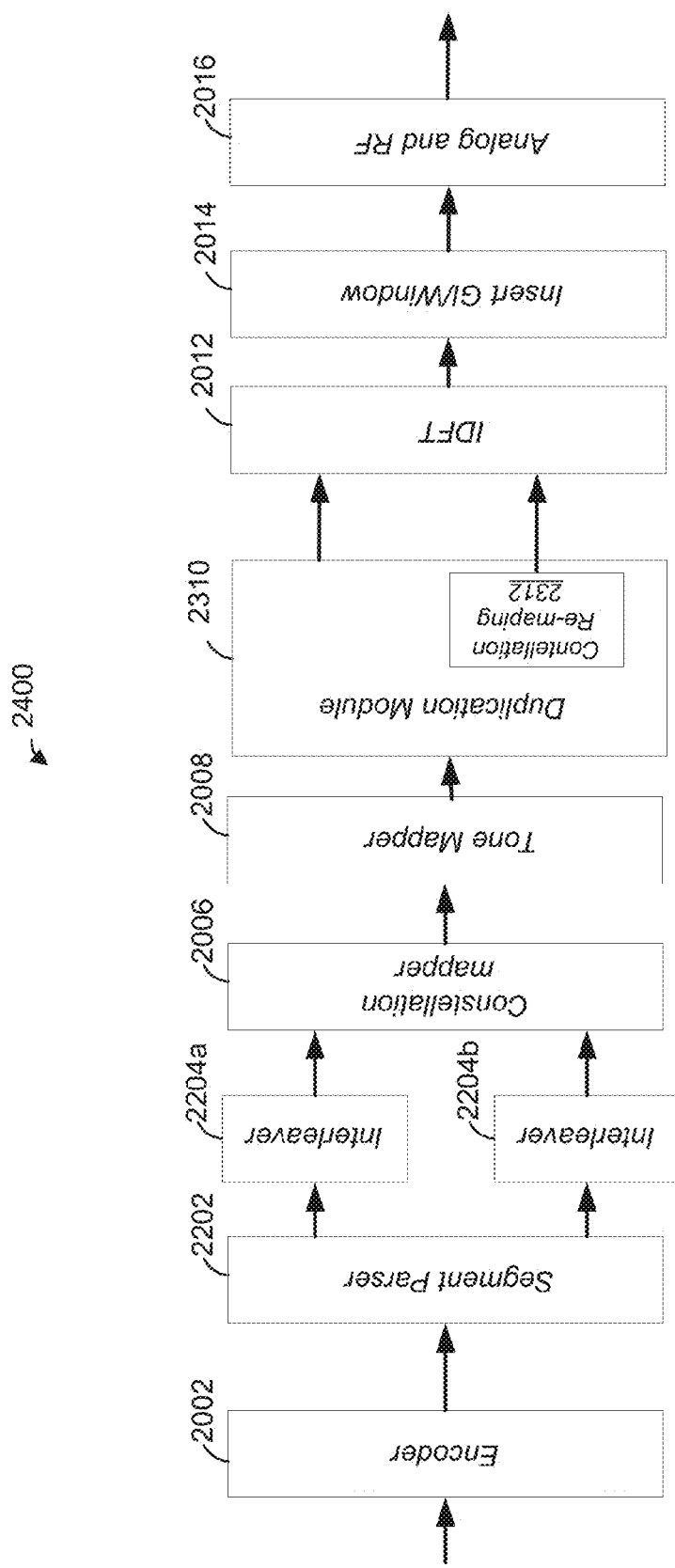

FIG. 24 is a block diagram of a transmit portion of an example PHY processing unit 2400 configured to generate a signal field such as one of the HE-SIG-B fields described herein, according to an embodiment. Referring to FIG. 1, the PHY processing unit 20 of AP 14 and the PHY processing unit 29 of client station 25-1 each include and/or are configured to perform the processing of the PHY processing unit 2400, in one embodiment. The PHY processing unit 2400 is generally similar to the PHY processing unit 2200 of FIG. 22, except that in the PHY processing unit 2300 constellation point duplication is combined with constellation point re-mapping for one or more of the copies of the HE-SIG-B field. To this end, in an embodiment, the duplication module 2010 of the PHY processing unit 2200 of FIG. 20 is replaced in the PHY processing unit 2400 with the duplication module 2310, which includes the constellation re-mapping module 2312, of FIG. 23.

Figure 25:
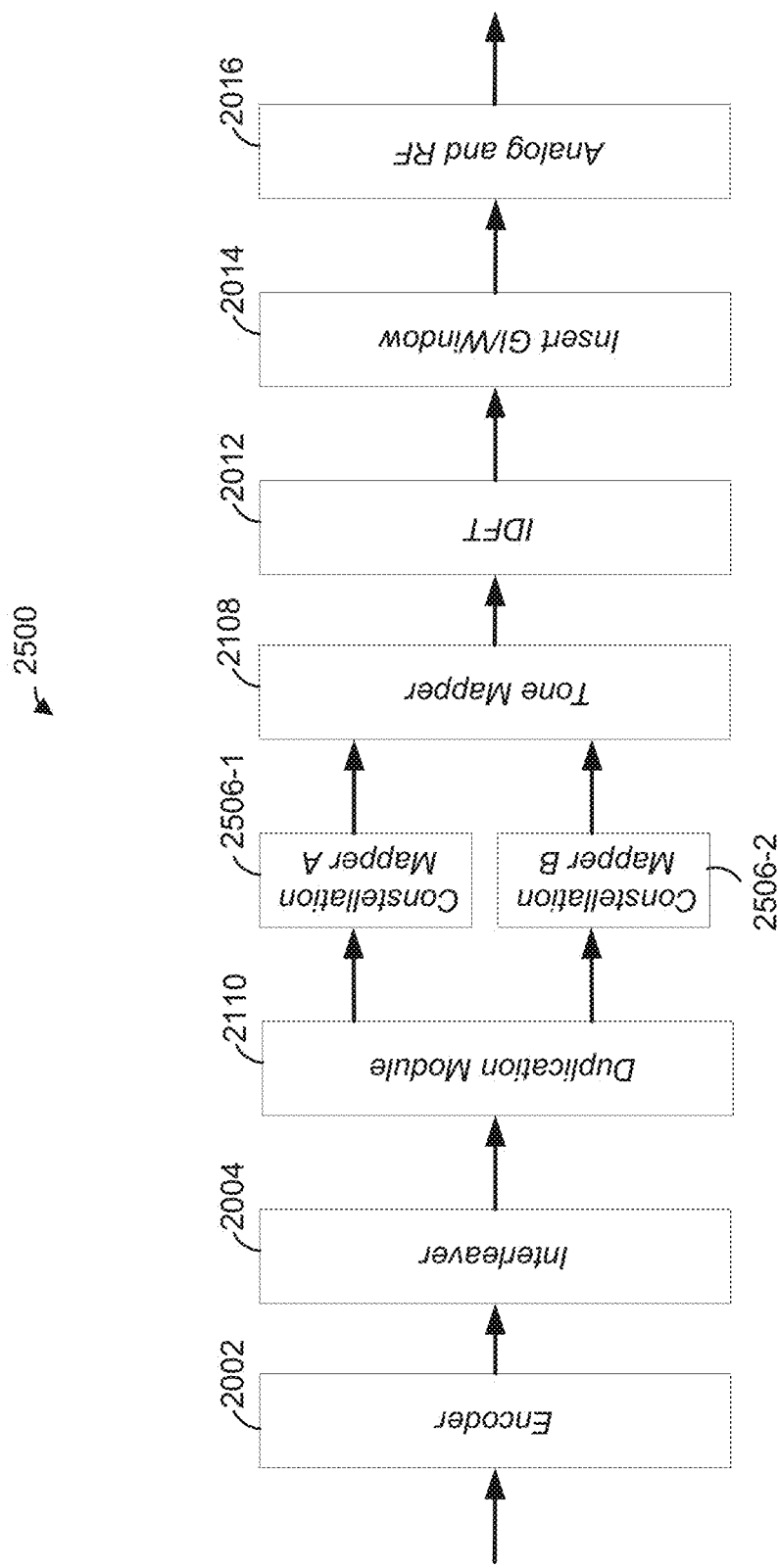

FIG. 25 is a block diagram of a transmit portion of an example PHY processing unit 2500 configured to generate a signal field such as one of the HE-SIG-B fields described herein, according to an embodiment. Referring to FIG. 1, the PHY processing unit 20 of AP 14 and the PHY processing unit 29 of client station 25-1 each include and/or are configured to perform the processing of the PHY processing unit 2500, in one embodiment. The PHY processing unit 2500 is generally similar to the PHY processing unit 2100 of FIG. 21, except that in the PHY processing unit 2500 bit level duplication is combined with different constellation point mappings for the copies of the HE-SIG-B field. Accordingly, the constellation mapper 2106 of the PHY processing unit 2100 of FIG. 21 is replaced in the PHY processing unit 2500 with a multiple castellation point mappers 2506 corresponding to copies of the HE-SIG-B generated by the duplication module 2110. In an embodiment, different ones of the castellation point mappers 2506 use different constellation point mapping schemes. As just an example, a constellation point mapper 2506-1 utilizes BPSK mapping, while a constellation mapper 2506-2 utilizes BPSK modulation phase-shifted by 90 degrees (or 180 degrees), in an embodiment. In other embodiments, other suitable castellation point mapping schemes are utilized by the constellation mapper 2506-1 and/or the constellation mapper 2506-2.

Figure 26:
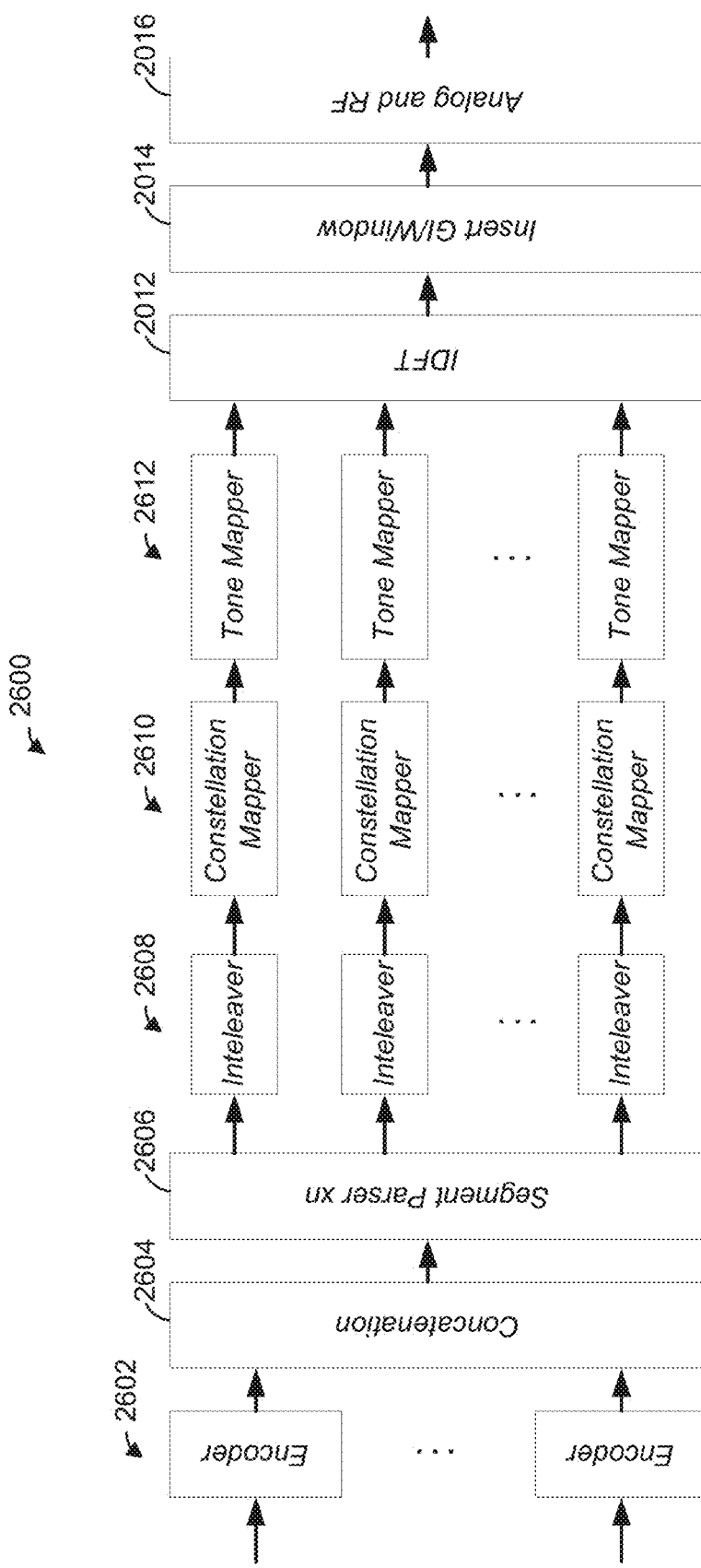

FIG. 26 is a block diagram of a transmit portion of an example PHY processing unit 2600 configured to generate a signal field such as one of the HE-SIG-B fields described herein, according to an embodiment. Referring to FIG. 1, the PHY processing unit 20 of AP 14 and the PHY processing unit 29 of client station 25-1 each include and/or are configured to perform the processing of the PHY processing unit 2600, in one embodiment. The PHY processing unit 2600 is generally similar to the PHY processing unit 2100 of FIG. 21, with several exceptions. The PHY processing unit 2600 includes a plurality of encoders 2602. In an embodiment, each encoder 2602 is the same as or similar to the encoder 2002 of FIG. 20. In an embodiment, each encoder 2602 operates on a portion of information bits of the HE-SIG-B field. As merely example, referring to FIG. 18C, each encoder 2602 operates on K user blocks corresponding to be included in a particular block 1876-2, in an embodiment. Additionally or alternatively, as merely another example, referring to FIG. 3 different ones of the encoders 2602 operate of different signal field content of the HE-SIG-B1 and the HE-SIG-B2, in an embodiment. As yet another example, referring to FIGS. 11A-11F, different ones of encoders 2602 utilize different coding rates for different portions of the HE-SIG-B. For example, a first encoder 2602 utilizes a rate R to encode information bits to be transmitted in a compete HE-SIG-B, while a second encoder 2602 utilizes a rate 2R to encode information bits to be transmitted in a partial HE-SIG-B, in an example embodiment.

Outputs of the encoders 2002 are provided to a concatenation module 2604 which concatenates encoded bits in any suitable order. An output of the concatenation module 2604 is provided to a segment parser 2606. The segment parser 2606 parses the encoded and concatenated bits into a plurality of segments corresponding to respective frequency sub-bands of the HE-SIG-B field, in an embodiment. As an example, the segment parser 2606 parses encoded and concatenated bits into segments corresponding to 20 MHz sub-bands of the HE-SIG-B field, in an embodiment. Each of the segments is operated on by a respective interleaver 2608, a respective constellation mapper 2610 and a respective tone mapper 2612, in an embodiment. In an embodiment, each interleaver 2608, each constellation mapper 2610 and each tone mapper 2612 is the same as or similar to, respectively, the interleaver 2004, the constellation mapper 2006 and the tone mapper 2008 of FIG. 20. In an embodiment, each interleaver 2608 utilizes interleaving parameters defined for a 20 MHz channel by a legacy communication protocol, such as the IEEE 802.11a, IEEE 802.11n, and the IEEE 802.11ac Standards. Similarly, each tone mapper 2612 utilizes tone mapping parameters defined for a 20 MHz channel by a legacy communication protocol, such as the IEEE 802.11a, IEEE 802.11n, and the IEEE 802.11 ac Standards. The interleavers 2608 and/or the tone mappers 2612 are omitted, in some embodiments.

Figure 27:
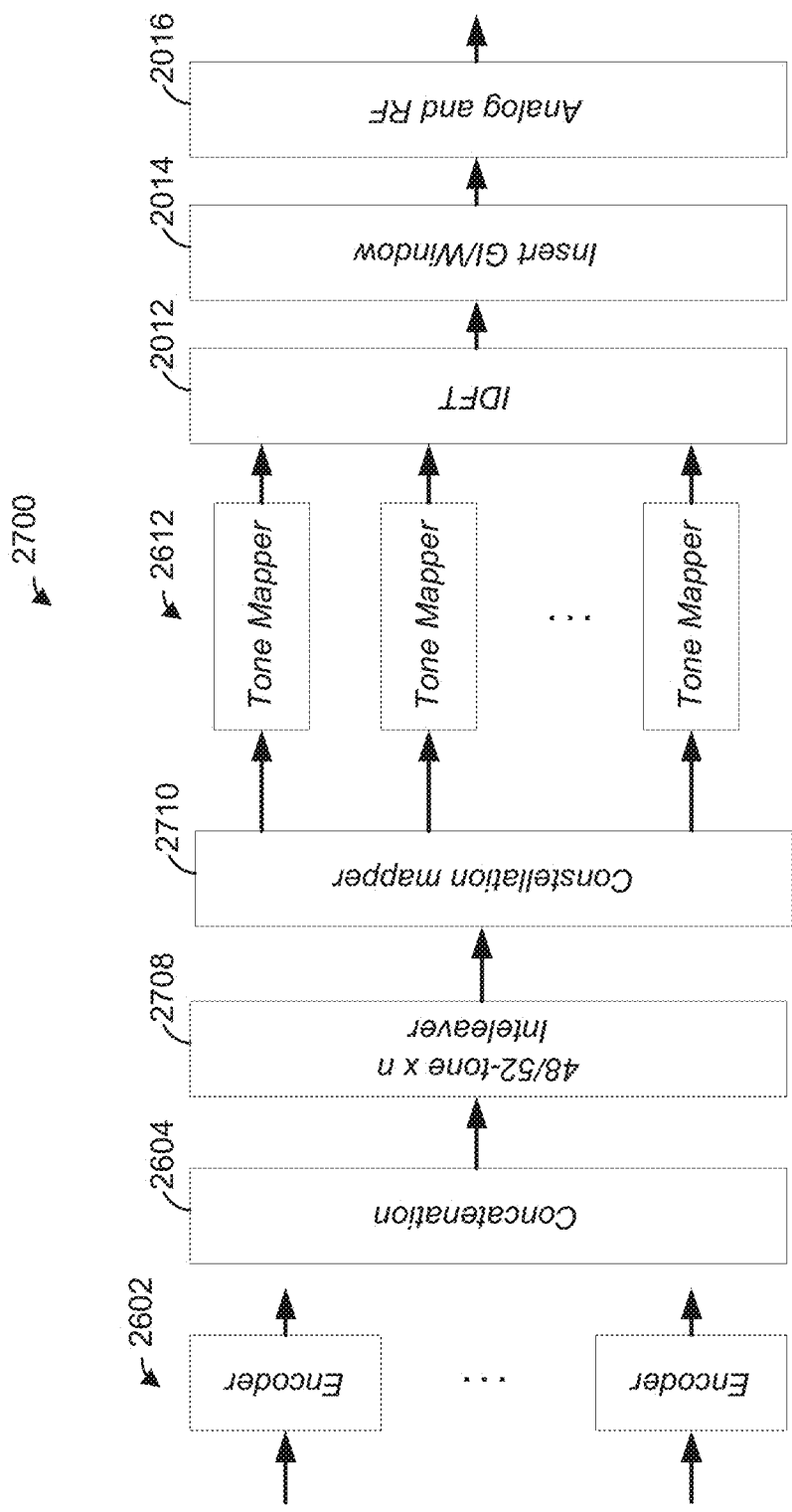

FIG. 27 is a block diagram of a transmit portion of an example PHY processing unit 2700 configured to generate a signal field such as one of the HE-SIG-B fields described herein, according to an embodiment. Referring to FIG. 1, the PHY processing unit 20 of AP 14 and the PHY processing unit 29 of client station 25-1 each include and/or are configured to perform the processing of the PHY processing unit 2700, in one embodiment. The PHY processing unit 2700 is generally similar to the PHY processing unit 2600 of FIG. 26, except that the multiple interleavers 2608 and the multiple castellation mappers 2610 in the PHY processing unit 2600 are replaced with a single interleaver 2708 and a single constellation mapper 2710, respectively, in an embodiment. The interleaver 2708 operates over the entire bandwidth of the HE-SIG-B field, in an embodiment. The interleaver 2708 utilizes different interleaving parameters depending on the bandwidth of the HE-SIG-B field, in an embodiment.

Figure 28:
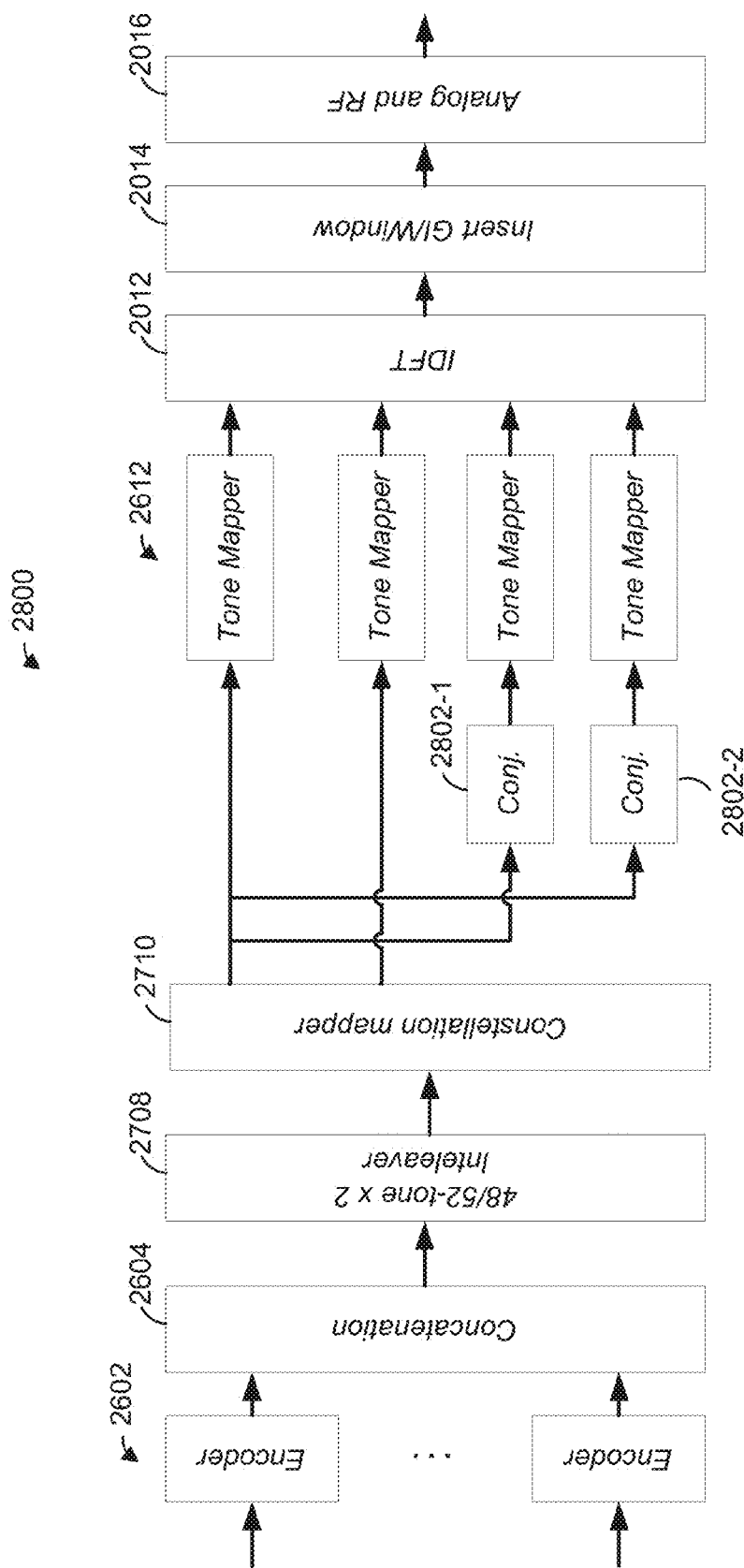

FIG. 28 is a block diagram of a transmit portion of an example PHY processing unit 2800 configured to generate a signal field such as one of the HE-SIG-B fields described herein, according to an embodiment. Referring to FIG. 1, the PHY processing unit 20 of AP 14 and the PHY processing unit 29 of client station 25-1 each include and/or are configured to perform the processing of the PHY processing unit 2800, in one embodiment. The PHY processing unit 2800 is generally similar to the PHY processing unit 2700 of FIG. 27, except that the PHY processing unit 2800 applies dual carrier modulation (DCM) to at least some of the sub-band of the HE-SIG-B field, in an embodiment. For ease of explanation, the PHY processing unit 2800 generates an 80 MHz-wide HE-SIG-B field with four 20 MHz sub-bands, in the illustrated embodiment. Similar techniques are applied to other signal field bandwidths, in other embodiments. The PHY processing unit 2800 includes two DCM (e.g., conjugation) modules 2802 corresponding to two of the four 20 MHz sub-bands, in the illustrated embodiment. Each DCM module 2802 applies a suitable mapping (e.g., conjugation) to a copy of constellation points corresponding to a respective one of the other two of the four 20 MHz sub-bands, in an embodiment.

Figure 29A:
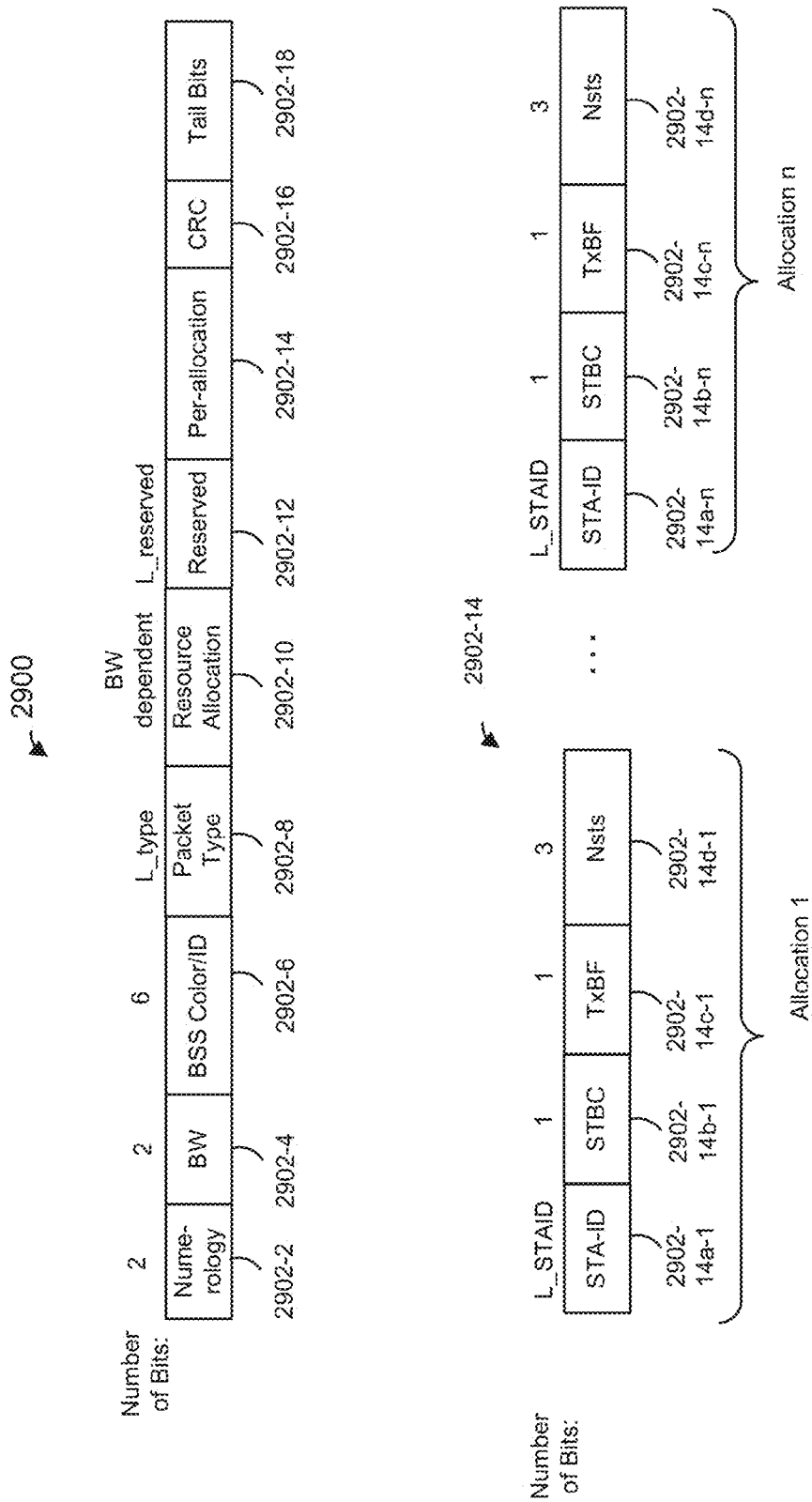
FIGS. 29A-29B are block diagrams of signal fields, according to embodiments.
Figure 29B:
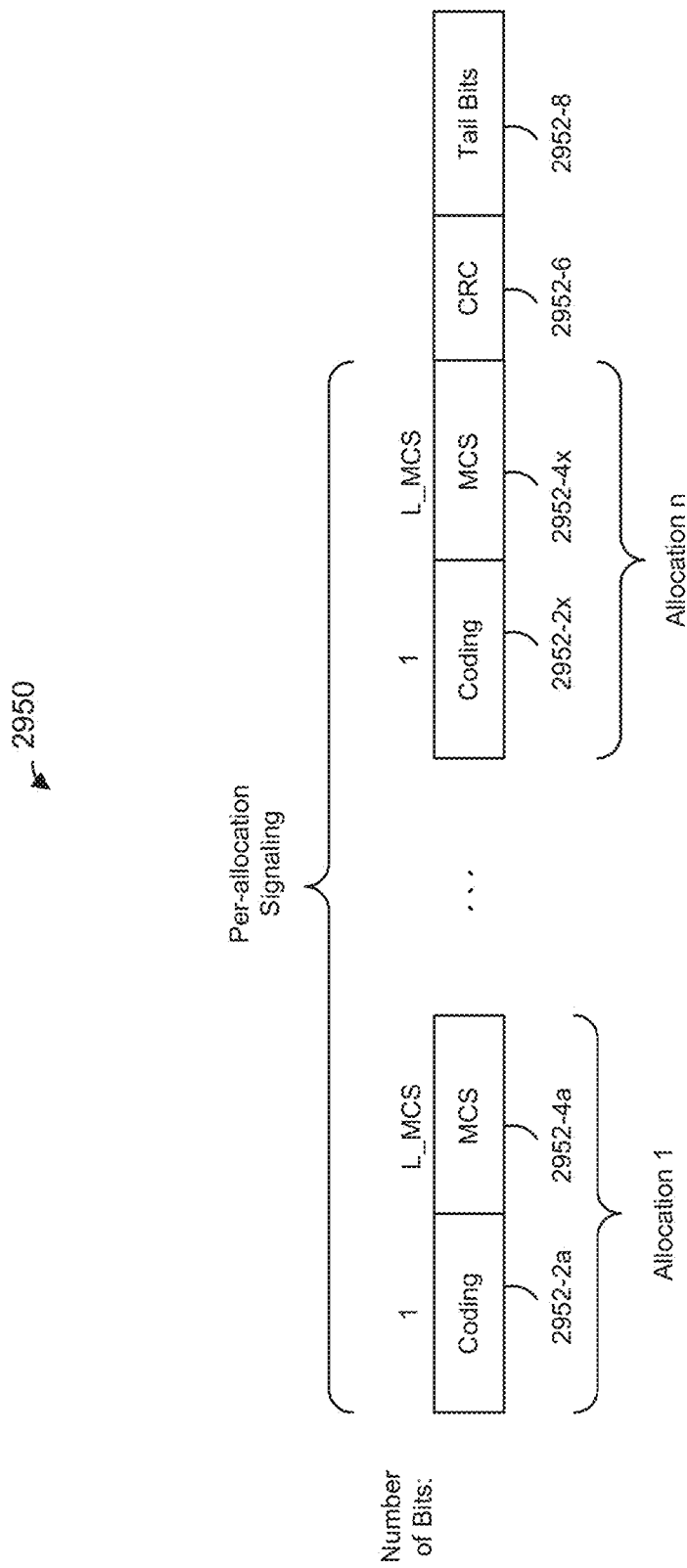

FIGS. 29A-29B are block diagrams of respective signal fields included in one or more of the data units of FIGS. 2-10, in various embodiments. Referring to FIG. 29A, a signal field 2900 corresponds to an HE-SIG-A field such as one of the HE-SIG-A fields described above with respect to at least some of the FIGS. 2-10, in various embodiments. The signal field 2900 includes a plurality of subfields 2902. Bit allocations for the subfields 2902, according to an example embodiment, are illustrated above the subfields 2902 in FIG. 29A. Other bit allocations are used for the subfields 2902, in other embodiments. The subfields 2902 include a numerology subfield 2902-2, a bandwidth (BW) subfield 2902-4, a basic service set (BSS) color subfield 2902-6, a packet type subfield 2902-8, a resource allocation subfield 2902-10, a reserved subfield 2902-12, a per-allocation subfield 2902-14, an cyclic redundancy check (CRC) subfield 12902-12, and tail bits 2902-14. In an embodiment, the resource allocation subfield 2902-10 indicates a plurality of resource units allocated for transmission of data in the data unit that includes the signal field 2900, and the per-allocation subfield 2902-14, itself, includes a plurality of subfields corresponding to different resource units indicated by the resource allocation subfield 2902-10. For example, the per-allocation subfield 2902-14 includes a STA-ID subfield 2902-14a, a respective STBC subfield 2902-14b, a respective TxBF subfield 2902-14c and a respective $N_{sts}$ 2902-14d subfield corresponding to each resource unit indicated by the resource allocation subfield 2902-10, in the illustrated embodiment.

Referring now to FIG. 29B, a signal field 2950 corresponds to an HE-SIG-B field and/or HE-SIG-C field such as one of the HE-SIG-B fields and/or HE-SIG-C fields described above with respect to at least some of the FIGS. 2-10, in various embodiments. In an embodiment, the signal field 2950 of FIG. 29B is used with the signal field 2900 of FIG. 29A. The signal field 2950 includes a plurality of subfields 2952. Bit allocations for the subfields 2952, according to an example embodiment, are illustrated above the subfields 2952 in FIG. 29B. Other bit allocations are used for the subfields 2952, in other embodiments. The subfields 2952 include respective coding subfield 2952-2 and a respective MCS subfield 2952-4 corresponding to each resource unit indicated by the resource allocation subfield 2902-10 of FIG. 29A, in an embodiment. The subfields 2952 also include CRC bits 2952-6 and tail bits 2952-8, in an embodiment. The CRC bits 2952-6 and/or the tail bits 2952-8 are omitted from the signal field 2950, in some embodiments.

In various embodiments, at least some of the subfields 2902 of FIG. 29A and the subfields 2952 of FIG. 29B are the same as or similar to the corresponding subfields described above with respect to FIGS. 12-17.

In some embodiments, distribution of the subfields 2902, 2952 between different signal fields is different as compared to the embodiment illustrated in FIGS. 29A-B and/or one or more the subfields 2902, 2952 are omitted from the signal fields 2900, 2950 and/or one or more additional subfields are included in the signal field 2900 and/or the signal field 2950. For example, the STA-ID subfields 2902-14a are omitted from the signal field 2900 and are instead included with corresponding allocation subfields 2952-2 of the signal field 2950, in an embodiment. In some embodiments, the $N_{sts}$ subfields 2902-14d are omitted from the signal field 2900 and are instead included with the corresponding per-allocation subfields 2952 of the signal field 2950. In some such embodiments, the signal field 2900 additionally includes a number of LTFs subfield to indicate the number of LTF(s) included in the data unit that includes the signal field 2900.

In an embodiment, the signal field 2900 includes a group ID subfield to indicate a group of client stations 25 for which data is included in the data unit that includes the signal field 2900. Further, the STA-ID subfields 2902-14a are replaced by shorter (e.g., 4-bit) member ID subfields that indicate particular members within the group indicated by the group ID subfield. The member ID subfields are included in the corresponding per-allocation subfields 2902-14 of the signal field 2900, in an embodiment. The member ID subfields are included in the corresponding per-allocation subfields are included in the corresponding per-allocation subfields 2952 of the signal field 2950, in another embodiment. Alternatively, in another embodiment, the signal field 2900 includes a group ID subfield and a member ordering subfield that indicates an order of per-allocation subfields corresponding to the members of the group indicated by the group ID subfield. In yet another embodiment, the member ordering subfield in the signal field 2900 is replaced by a list of scheduled stations subfield to indicate which client stations in the group that are scheduled to receive data in the data unit that includes the signal field 2900. The STA-ID subfields 2902-14a are omitted from the signal field 2900 and are not included in the signal field 2950 because client stations can determine their parameters based on the order of the parameters in the signal fields 2900, 2950 or based on the listing of scheduled stations, in such embodiments.

Figure 30:
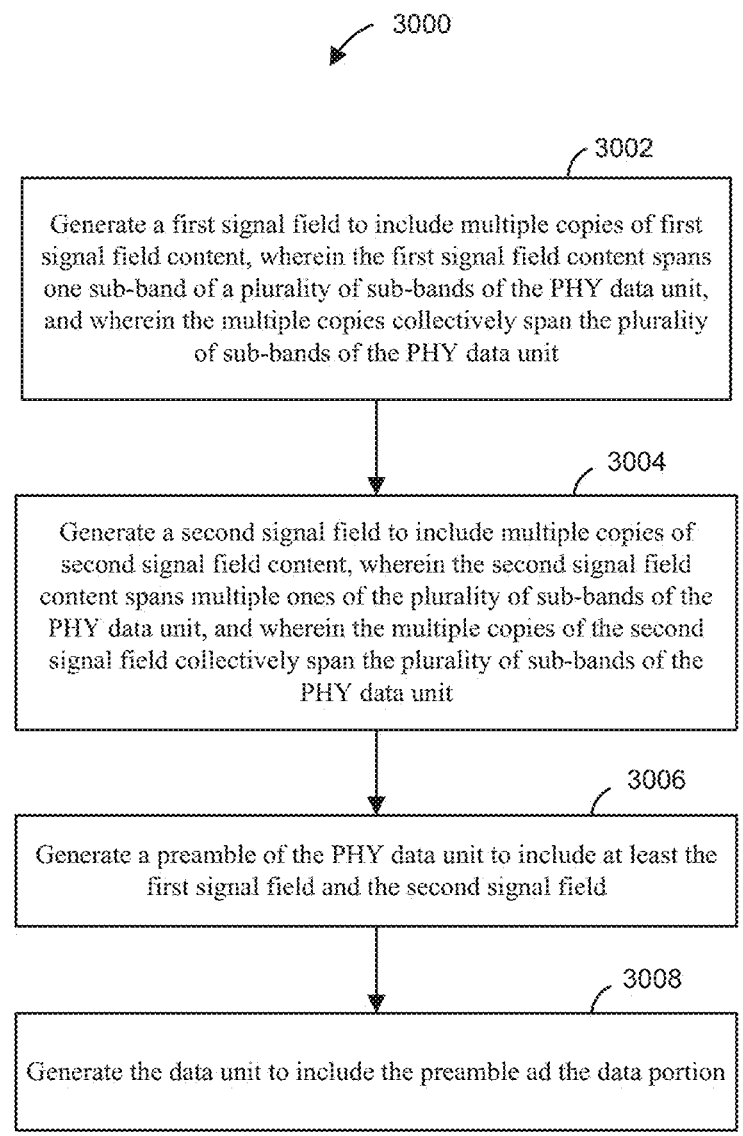
FIG. 30 is a flow diagram of a method for generating a data unit, according to an embodiment.

FIG. 30 is a flow diagram of an example method 3000 for processing a data unit, according to an embodiment. With reference to FIG. 1, the method 3000 is implemented by the network interface device 16, in an embodiment. For example, in one such embodiment, the PHY processing unit 20 is configured to implement the method 3000. According to another embodiment, the MAC processing 18 is also configured to implement at least a part of the method 3000. With continued reference to FIG. 1, in yet another embodiment, the method 3000 is implemented by the network interface device 27 (e.g., the PHY processing unit 29 and/or the MAC processing unit 28). In other embodiments, the method 3000 is implemented by other suitable network interface devices.

At block 3002, a first signal field to be included in the PHY data unit is generated. The first signal field is generated to include multiple copies of first signal field content, where the first signal field content spans one sub-band of a plurality of sub-bands of the PHY data unit and the multiple copies of first signal field content collectively span the plurality of sub-bands of the PHY data unit. As an example, referring to FIG. 2, the HE-SIG-A 210 is generated, in an embodiment. As another example, referring to FIG. 3, the HE-SIG-A 310 is generated, in another embodiment. In these embodiments, first signal field content spans one of four sub-bands of the data unit, and the first signal field is generated to include four copies of the signal field that collectively span the four sub-bands of the PHY data unit. In other embodiments, other suitable signal fields are generated.

At block 3004, a second signal field to be included in the PHY data unit is generated. The second signal field is generated to include multiple copies of second signal field content, where the second signal field content spans multiple ones of the plurality of sub-bands of the PHY data unit and the multiple copies of second signal field content collectively span the plurality of sub-bands of the PHY data unit. As an example, referring to FIG. 2, the HE-SIG-B 212 is generated, in an embodiment. In this embodiment, the second signal fiend content includes content of one copy of the two copies of HE-SIG-B 212. As another example, referring to FIG. 3, the HE-SIG-A 310 is generated, in another embodiment. In this embodiment, second signal field content includes content of one copy of the HE-SIG-B1 312a and content of one copy the HE-SIG-B2 312a. In these embodiments, the second signal field content spans two sub-bands of the four sub-bands of the PHY data unit, and the second signal field is generated to include two copies of the second signal field content that collectively span the four sub-bands of the PHY data unit. In other embodiments, the second signal field content spans a number of sub-bands other than two sub-bands and/or suitable signal fields other than the HE-SIG-B 212 of FIG. 2 or the HE-SIG-B 312 of FIG. 3 are generated.

At block 3006, a preamble of the data unit is generated to include at least the first signal field generated at block 3002 and the second signal field generated at block 3004. In an embodiment, the preamble is generated such that the second signal field will be transmitted immediately after the first signal field. In some embodiments, the preamble is generated to further include one or more training fields. The preamble is generated such that the first signal field and the second signal field will be transmitted before the one or more training fields. In other embodiments, the preamble is generated in other suitable manners.

At block 3008, the data unit is generated to include at least the preamble generated at block 3006.

In an embodiment, a method for generating a physical layer (PHY) data unit for transmission via a communication channel includes generating a first signal field to include multiple copies of first signal field content, wherein the first signal field content spans one sub-band of a plurality of sub-bands of the PHY data unit, and wherein the multiple copies collectively span the plurality of sub-bands of the PHY data unit. The method also includes generating a second signal field to include multiple copies of second signal field content, wherein the second signal field content spans multiple ones of the plurality of sub-bands of the PHY data unit, and wherein the multiple copies of the second signal field collectively span the plurality of sub-bands of the PHY data unit. The method additionally includes generating a preamble of the PHY data unit to include at least the first signal field and the second signal field, and generating the PHY data unit to include at least the preamble.

In other embodiments, the method includes any suitable combination of one or more of the following features.

The second signal field content spans two sub-bands of the PHY data unit.

Generating the preamble to include the first signal field and the second signal field comprises generating the preamble such that the second signal field will be transmitted immediately after the first signal field.

The method further comprises generating one or more training fields to be included in the PHY data unit, wherein generating the preamble comprises generating the preamble to further include the one or more training fields, including generating the preamble such that the first signal field and the second signal field will be transmitted before the one or more training fields.

The method further comprises causing the PHY data unit to be transmitted to one or more communication devices.

The method further comprises, after generating the second signal field and before causing the PHY data unit to be transmitted to the one or more communication devices, puncturing at least a portion of at least one of the multiple copies of the second signal field content such that the punctured portion of the second signal field content will not be transmitted to the one or more communication devices.

Generating the PHY data unit comprises generating an orthogonal frequency division multiplexing multiple access (OFDMA) data unit that includes data to be transmitted to multiple communication devices using respective frequency portions of a data portion of the PHY data unit.

The second signal field content includes include a set of information bits, the set of information bits including (i) a common block of information bits, the common block having information common to the multiple communication devices and (ii) a plurality of user blocks of information bits, each user block having information for a respective one of the multiple communication devices.

The method further comprises encoding the set of information bits using one or more binary convolutional code (BCC) encoders, including encoding the common block of information bits as a first BCC block, and encoding respective groups of user blocks of information bits as respective second BCC blocks, wherein each group of user blocks includes more one user block in the plurality of user blocks and less than all user blocks in the plurality of user blocks.

Encoding respective groups of user blocks includes encoding a last group of user blocks, wherein the last group of user blocks includes less user blocks than any previous group of user blocks.

The method further comprises determining a number of padding bits to be appended to the set of information bits such that the information bits and the padding bits, after having been encoded by the one or more BCC encoders, fill an integer number of OFDM symbols.

The method further comprises, prior to encoding the set of information bits, appending the determined number of padding bits to the set of information bits.

In another embodiment, an apparatus comprises a network interface device having one or more integrated circuits configured to generate a first signal field to include multiple copies of first signal field content, wherein the first signal field content spans one sub-band of a plurality of sub-bands of the PHY data unit, and wherein the multiple copies collectively span the plurality of sub-bands of the PHY data unit. The one or more integrated circuits are also configured to generate a second signal field to include multiple copies of second signal field content, wherein the second signal field content spans multiple ones of the plurality of sub-bands of the PHY data unit, and wherein the multiple copies of the second signal field collectively span the plurality of sub-bands of the PHY data unit. The one or more integrated circuits are additionally configured to generate a preamble of the PHY data unit to include at least the first signal field and the second signal field, and generate the PHY data unit to include at least the preamble.

In other embodiments, the apparatus comprises any suitable combination of one or more of the following features.

The second signal field content spans two sub-bands of the PHY data unit.

The one or more integrated circuits are configured to generate the preamble such that the second signal field will be transmitted immediately after the first signal field.

The one or more integrated circuits are further configured to generate one or more training fields to be included in the PHY data unit.

The one or more integrated circuits are further configured to generate the preamble to further include the one or more training fields, wherein the preamble is generated such that the first signal field and the second signal field will be transmitted before the one or more training fields.

The one or more integrated circuits are further configured to cause the PHY data unit to be transmitted to one or more communication devices.

The one or more integrated circuits are further configured to, after generating the second signal field and before causing the PHY data unit to be transmitted to the one or more communication devices, puncture at least a portion of at least one of the multiple copies of the second signal field content such that the punctured portion of the second signal field content will not be transmitted to the one or more communication devices.

The PHY data unit is an orthogonal frequency division multiplexing multiple access (OFDMA) data unit that includes data to be transmitted to multiple communication devices using respective resource units in a data portion of the PHY data unit.

The second signal field content includes a set of information bits including (i) a common block of information bits, the common block having information common to the multiple communication devices and (ii) a plurality of user blocks of information bits, each user block having information for a respective one of the multiple communication devices.

The one or more integrated circuits are further configured to encode the set of information bits, including encoding the common block of information bits as a first BCC block, and encoding respective groups of user blocks of information bits as respective second BCC blocks, wherein each group of user blocks includes more one user block in the plurality of user blocks and less than all user blocks in the plurality of user blocks.

The one or more integrated circuits are configured to encode a last group of user blocks, wherein the last group of user blocks includes less user blocks than any previous group of user blocks.

The one or more integrated circuits are further configured to determine a number of padding bits to be appended to the set of information bits such that the information bits and the padding bits, after having been encoded by the one or more BCC encoders, fill an integer number of OFDM symbols.

The one or more integrated circuits are further configured to, prior to encoding the set of information bits, append the determined number of padding bits to the set of information bits.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a physical layer (PHY) data unit for transmission via a communication channel, the method comprising:
generating, by a first communication device, a first signal field to include multiple copies of first signal field content, wherein the first signal field content spans one sub-band of a plurality of sub-bands of the PHY data unit, and wherein the multiple copies collectively span the plurality of sub-bands of the PHY data unit;
generating, by the first communication device, a second signal field to include multiple copies of second signal field content, wherein the second signal field content spans multiple ones of the plurality of sub-bands of the PHY data unit, wherein the multiple copies of the second signal field collectively span the plurality of sub-bands of the PHY data unit, wherein generating the second signal field includes:
generating the second signal field to include (i) a common block of information bits having information for multiple second communication devices and (ii) a plurality of user blocks of information bits, each user block having information for a respective one of the multiple second communication devices,
encoding the common block as a first encoded block, and
encoding each group of user blocks, of the plurality of user blocks, as a respective second encoded block, wherein each of at least some of the groups of user blocks includes more than one user block in the plurality of user blocks and less than all user blocks in the plurality of user blocks, to allow the multiple second communication devices to efficiently decode the second signal field;
generating, by the first communication device, a preamble of the PHY data unit to include at least the first signal field and the second signal field; and
generating, by the first communication device, the PHY data unit to include at least the preamble.

2. The method of claim 1, wherein the second signal field content spans two sub-bands of the PHY data unit.

3. The method of claim 1, wherein generating the preamble to include the first signal field and the second signal field comprises generating the preamble such that the second signal field will be transmitted immediately after the first signal field.

4. The method of claim 1, further comprising generating, by the first communication device, one or more training fields to be included in the PHY data unit, wherein generating the preamble comprises generating the preamble to further include the one or more training fields, including generating the preamble such that the first signal field and the second signal field will be transmitted before the one or more training fields.

5. The method of claim 1, further comprising causing the PHY data unit to be transmitted to multiple second communication devices.

6. The method of claim 5, further comprising, after generating the second signal field and before causing the PHY data unit to be transmitted to the multiple second communication devices, puncturing, by the first communication device, at least a portion of at least one of the multiple copies of the second signal field content such that the punctured portion of the second signal field content will not be transmitted to the multiple second communication devices.

7. The method of claim 1, wherein:
generating the PHY data unit comprises generating an orthogonal frequency division multiplexing multiple access (OFDMA) data unit that includes data to be transmitted to the multiple second communication devices using respective frequency portions of a data portion of the PHY data unit.

8. The method of claim 7, wherein:
encoding the common block a first encoded block comprises encoding the common block as a first binary convolutional code (BCC) block, and
encoding each group of user blocks, of the plurality of user blocks, as a respective second encoded block comprises encoding each group of user blocks as a respective BCC blocks.

9. The method of claim 1, wherein encoding each group of user blocks includes encoding a last group of user blocks, wherein the last group of user blocks includes less user blocks than any previous group of user blocks.

10. The method of claim 8, further comprising:
determining, by the first communication device, a number of padding bits to be appended to the set of information bits such that the information bits and the padding bits, after having been encoded, fill an integer number of OFDM symbols, and
prior to encoding the set of information bits, appending, by the first communication device, the determined number of padding bits to the set of information bits.

11. An apparatus, comprising:
a network interface device having one or more integrated circuits configured to
generate a first signal field to include multiple copies of first signal field content, wherein the first signal field content spans one sub-band of a plurality of sub-bands of the PHY data unit, and wherein the multiple copies collectively span the plurality of sub-bands of the PHY data unit;
generate a second signal field to include multiple copies of second signal field content, wherein the second signal field content spans multiple ones of the plurality of sub-bands of the PHY data unit, wherein the multiple copies of the second signal field collectively span the plurality of sub-bands of the PHY data unit, wherein generating the second signal field includes:
generating the second signal field to include (i) a common block of information bits having information for multiple second communication devices and (ii) a plurality of user blocks of information bits, each user block having information for a respective one of the multiple second communication devices,
encoding the common block as a first encoded block, and
encoding each group of user blocks, of the plurality of user blocks, as a respective second encoded block, wherein each of at least some of the groups of user blocks includes more than one user block in the plurality of user blocks and less than all user blocks in the plurality of user blocks, to allow the multiple second communication devices to efficiently decode the second signal field;
generate a preamble of the PHY data unit to include at least the first signal field and the second signal field; and
generate the PHY data unit to include at least the preamble.

12. The apparatus of claim 11, wherein the second signal field content spans two sub-bands of the PHY data unit.

13. The apparatus of claim 11, wherein the one or more integrated circuits are configured to generate the preamble such that the second signal field will be transmitted immediately after the first signal field.

14. The apparatus of claim 11, wherein the one or more integrated circuits are further configured to:
generate one or more training fields to be included in the PHY data unit, and
generate the preamble to further include the one or more training fields, wherein the preamble is generated such that the first signal field and the second signal field will be transmitted before the one or more training fields.

15. The apparatus of claim 11, wherein the one or more integrated circuits are further configured to cause the PHY data unit to be transmitted to the multiple communication devices.

16. The apparatus of claim 15, wherein the one or more integrated circuits are further configured to, after generating the second signal field and before causing the PHY data unit to be transmitted to the multiple communication devices, puncture at least a portion of at least one of the multiple copies of the second signal field content such that the punctured portion of the second signal field content will not be transmitted to the multiple communication devices.

17. The apparatus of claim 11, wherein:
the PHY data unit is an orthogonal frequency division multiplexing multiple access (OFDMA) data unit that includes data to be transmitted to multiple communication devices using respective resource units in a data portion of the PHY data unit.

18. The apparatus of claim 17, wherein:
encoding the common block a first encoded block comprises encoding the common block as a first binary convolutional code (BCC) block, and
encoding each group of user blocks, of the plurality of user blocks, as a respective second encoded block comprises encoding each group of user blocks as a respective BCC block.

19. The apparatus of claim 11, wherein the one or more integrated circuits are configured to encode a last group of user blocks, wherein the last group of user blocks includes less user blocks than any previous group of user blocks.

20. The apparatus of claim 18, wherein the one or more integrated circuits are further configured to:
determine a number of padding bits to be appended to the set of information bits such that the information bits and the padding bits, after having been encoded, fill an integer number of OFDM symbols, and
prior to encoding the set of information bits, append the determined number of padding bits to the set of information bits.

* * * * *